United States Patent
Obrecht

(10) Patent No.: US 8,664,315 B2
(45) Date of Patent: *Mar. 4, 2014

(54) NITRILE RUBBERS WHICH OPTIONALLY CONTAIN ALKYLTHIO TERMINAL GROUPS AND WHICH ARE OPTIONALLY HYDROGENATED

(75) Inventor: Werner Obrecht, Moers (DE)

(73) Assignee: LANXESS Deutschland GmbH, Cologne (DE)

( * ) Notice: Subject to any disclaimer, the term of this patent is extended or adjusted under 35 U.S.C. 154(b) by 276 days.

This patent is subject to a terminal disclaimer.

(21) Appl. No.: 12/864,381

(22) PCT Filed: Jan. 16, 2009

(86) PCT No.: PCT/EP2009/050460
§ 371 (c)(1),
(2), (4) Date: Feb. 9, 2011

(87) PCT Pub. No.: WO2009/095313
PCT Pub. Date: Aug. 6, 2009

(65) Prior Publication Data
US 2011/0123748 A1    May 26, 2011

(30) Foreign Application Priority Data
Jan. 29, 2008  (EP) .................................. 08150760

(51) Int. Cl.
*C08K 5/09*    (2006.01)

(52) U.S. Cl.
USPC ....................................................... 524/400

(58) Field of Classification Search
USPC ....................................................... 524/400
See application file for complete search history.

(56) References Cited

U.S. PATENT DOCUMENTS

| | | |
|---|---|---|
| 2,487,263 A | 11/1949 | Mueller |
| 3,700,637 A | 10/1972 | Finch, Jr. |
| 3,915,909 A | 10/1975 | Schnoring et al. |
| 4,345,067 A | 8/1982 | Wunder |
| 4,464,515 A | 8/1984 | Rempel et al. |
| 4,503,196 A | 3/1985 | Rempel et al. |
| 4,536,568 A | 8/1985 | Wunder |
| 4,581,417 A | 4/1986 | Buding et al. |
| 4,631,315 A | 12/1986 | Buding et al. |
| 4,647,652 A | 3/1987 | Eichenauer et al. |
| 4,746,707 A | 5/1988 | Fiedler et al. |
| 4,795,788 A | 1/1989 | Himmler et al. |
| 4,812,528 A | 3/1989 | Rempel et al. |
| 4,816,525 A | 3/1989 | Rempel et al. |
| 4,920,176 A * | 4/1990 | Jorgensen, Jr. ................. 525/185 |
| 4,978,771 A | 12/1990 | Fiedler et al. |
| RE34,548 E | 2/1994 | Fiedler et al. |
| 5,556,919 A * | 9/1996 | Oyama et al. .................. 525/189 |
| 5,627,250 A * | 5/1997 | Tsuji et al. ..................... 526/338 |
| 5,703,189 A | 12/1997 | Tsuji et al. |
| 5,708,132 A | 1/1998 | Grimm |
| 5,807,941 A | 9/1998 | Tsuji et al. |
| 6,673,881 B2 | 1/2004 | Guerin |
| 6,683,136 B2 | 1/2004 | Guo et al. |
| 6,780,939 B2 | 8/2004 | Guerin et al. |
| 7,772,328 B2 | 8/2010 | Guerin et al. |
| 2003/0236348 A1 | 12/2003 | Wendling et al. |
| 2004/0236029 A1 | 11/2004 | Guerin et al. |
| 2008/0146687 A1 | 6/2008 | Ueda |
| 2008/0176974 A1 | 7/2008 | Ueda |
| 2008/0293868 A1 * | 11/2008 | Obrecht ......................... 524/439 |
| 2008/0293869 A1 * | 11/2008 | Obrecht ......................... 524/439 |
| 2008/0293889 A1 | 11/2008 | Obrecht |
| 2008/0293902 A1 | 11/2008 | Obrecht et al. |
| 2010/0240838 A1 | 9/2010 | Guerin et al. |
| 2010/0240848 A1 | 9/2010 | Guerin et al. |
| 2011/0059279 A1 * | 3/2011 | Obrecht ......................... 428/36.8 |

FOREIGN PATENT DOCUMENTS

| | | |
|---|---|---|
| DE | 102004013008 A1 | 10/2005 |
| EP | 0002015 A1 | 5/1979 |
| EP | 0471250 A1 | 2/1992 |
| GB | 823824 | 11/1859 |
| GB | 785631 | 10/1957 |
| GB | 823823 | 11/1959 |
| GB | 1558491 A | 1/1980 |
| JP | 27902/73 | 4/1969 |
| JP | 7316126 | 12/1995 |
| JP | 7316127 | 12/1995 |
| JP | 7316128 | 12/1995 |

OTHER PUBLICATIONS

International Search Report from co-pending Application PCT/EP2009/050460 dated Apr. 27, 2009, 4 pages.
Hofmann W.; Rubber Chem. Technol. 36 (1963) 1; "Vulcanizate Structure, Relaxation, and Tensile Strength of Polyisoprenes" pp. 815-834.
Ullmann's Encyclopedia of Industrial Chemistry, vol. A23, VCH Verlagsgesellschaft, Weinheim 1993, pp. 255-261 Rubber, 3. Synthetic.
Welz, B., "Atomic Absorption Spectrometry", 2nd Ed., Verlag Chemie, Weinheim 1985, chapters 9.1, 9.1.1, 9.1.2 and 9.1.3; pp. 251-262).
Uraneck, C.A.; Rubber Chemistry and Techology (1976) 49(3), 610-49; "Molecular weight control of elastomers prepared by emulsion polymerization".
Blackley, D.C.: Emulsion Polymerization, Theory and Practice, Applied Science Publishers, Ltd London. (1975), pp. 329-381.

* cited by examiner

Primary Examiner — Ling Choi
Assistant Examiner — Lanee Reuther
(74) Attorney, Agent, or Firm — Nicanor A. Kohncke

(57) ABSTRACT

An improved polymerization and processing method allows the production of special nitrile rubbers which are characterized by a specific cation content which leads to an excellent storage stability and particularly good vulcanization rate and moreover results in vulcanized materials that have advantageous properties.

12 Claims, No Drawings

NITRILE RUBBERS WHICH OPTIONALLY CONTAIN ALKYLTHIO TERMINAL GROUPS AND WHICH ARE OPTIONALLY HYDROGENATED

The invention relates to a nitrile rubber, a process for producing it, vulcanizable mixtures based on this nitrile rubber, also a process for producing vulcanizates from these mixtures and the vulcanizates obtained in this way.

For the purposes of the present invention, nitrile rubbers, also referred to as "NBRs" for short, are rubbers which are copolymers or terpolymers of at least one $\alpha,\beta$-unsaturated nitrile, at least one conjugated diene and optionally one or more further copolymerizable monomers.

Such nitrile rubbers and processes for producing such nitrile rubbers are known, see, for example, W. Hofmann, Rubber Chem. Technol. 36 (1963) 1 and Ullmann's Encyclopedia of Industrial Chemistry, VCH Verlagsgesellschaft, Weinheim, 1993, pp. 255-261. In these publications there is no indication as to whether and if appropriate how the vulcanization rate of such rubbers and the property profile, in particular the value of the modulus, can be influenced.

NBR is produced by emulsion polymerization, which firstly gives an NBR latex. The NBR solid is isolated from this latex by coagulation. Salts and acids are used for coagulation. In the coagulation of latices by means of metal salts, it is known that significantly larger amounts of electrolyte are required in the case of monovalent metal ions, e.g. in the form of sodium chloride, than in the case of polyvalent metal ions, e.g. in the form of calcium chloride, magnesium chloride or aluminium sulphate (Kolloid-Z. 154, 154 (1957)). It is also known that the use of polyvalent metal ions leads to "at least some inclusion of the emulsifier in the product" (Houben-Weyl (1961), Methoden der Org. Chemie, Makromolelculare Stoffe 1, p. 484). According to Houben-Weyl (1961), Methoden der Org. Chemie, Makromolekulare Stoffe 1, p. 479, "not only do the electrolytes used have to be very carefully washed out again, but the finished product should also be free of the catalysts and emulsifiers of the process batch. Even small amounts of residual electrolytes give turbid and cloudy pressed and injection-moulded parts, impair the electrical properties and increase the water absorption capacity of the finished product" (citation). Houben-Weyl gives no indication as to how a latex has to be worked up in order to give nitrile rubbers which vulcanize quickly and display a high modulus after vulcanization.

DD 154 702 discloses a process for the free-radical copolymerization of butadiene and acrylonitrile in emulsion, which is controlled by means of a specific, advantageously computer-aided metering program for the monomers and the molecular weight regulators, e.g. tert-dodecyl mercaptan, and in which the latices obtained are worked up by coagulation in an acid medium to give the solid rubber. A significant advantage of the process is said to be that the resin soaps and/or fatty acid soaps used as emulsifiers remain in the rubber as a result of the use of acids in the coagulation, i.e. they are not washed out as in the case of other processes. In addition to the advantage of good properties of the NBR, the improvement in the economics of the process and the avoidance of wastewater pollution by the washed-out emulsifier are specifically advertised here. It is stated that the butadiene-acrylonitrile copolymers containing 10-30% by weight of acrylonitrile obtained have good elasticity and low-temperature properties combined with an increased swelling resistance and advantageous processability. Measures by means of which the vulcanization rate of the nitrile rubber and the property profile of the vulcanized NBR can be influenced are not revealed by the teachings of this patent.

JP 27902/73 (Appl. 69 32,322) discloses that the use of amines in the coagulation of latices by means of magnesium salts, for example by means of a combination of diethylenetriamine and magnesium chloride, enables the initial vulcanization rate to be reduced and thus the scorch resistance of nitrile rubbers to be improved. Further information on this subject is not to be found in this prior art.

DE-A 23 32 096 discloses that rubbers can be precipitated from their aqueous dispersions by means of methylcellulose and a water-soluble alkali metal, alkaline earth metal, aluminium or zinc salt. Preference is given to using sodium chloride as water-soluble salt. It is stated that an advantage of this process is that it gives a coagulum which is virtually completely free of extraneous constituents such as emulsifiers, catalysts residues and the like since these extraneous materials are removed together with the water when the coagulum is separated off and any remaining residues are completely washed out by means of further water. Information about the vulcanization behaviour of rubbers produced in this way is not given. In DE-A 24 25 441, the electrolyte coagulation of rubber latices is carried out using 0.1-10% by weight (based on the rubber) of water-soluble $C_2$-$C_4$ alkylcelluloses or hydroxyalkylcelluloses in combination with from 0.02 to 10% by weight (based on the rubber) of a water-soluble alkali metal, alkaline earth metal, aluminium or zinc salt as auxiliary instead of methylcellulose. Here too, preference is given to using sodium chloride as water-soluble salt. The coagulum is separated off mechanically, optionally washed with water and the remaining water is removed. Here too, it is stated that the extraneous materials are, as in DE-A 23 32 096, essentially completely removed together with the water when the coagulum is separated off and any remaining residues are washed out completely in the washing with further water.

U.S. Pat. No. 5,708,132 (Goodyear) describes a process for working up nitrile rubber latices, which displays improved storage stability (70° C./28 days) and a higher full vulcanization rate (TC90). Mixtures of salts and acids, in particular sulphuric acid, are used for coagulation of the latex. The process is characterized by maintenance of a narrow pH range in the washing of the crumb, with the pH of the washing water being in the range from 5 to 8, preferably from 5.5 to 7.5, particularly preferably from 6 to 7. Calcium hydroxide, magnesium hydroxide and sodium hydroxide are used for adjusting the pH, with the use of sodium hydroxide being preferred. An ageing inhibitor based on alkylated aryl phosphites, in particular alkylated aryl phosphites in combination with sterically hindered phenols, is used for stabilizing the nitrile rubber. After washing, the rubber crumb is dewatered in a screw apparatus to residual moisture contents of from 7 to 10% by weight and subsequently dried thermally.

In DE-A 27 51 786, it is established that the precipitation and isolation of rubbers from their aqueous dispersions can be carried out by means of a smaller amount of (hydroxy)alkylcellulose when from 0.02 to 0.25% by weight of a water-soluble calcium salt is used. A further advantage is said to be that this process gives an extremely pure coagulum which is essentially completely free of extraneous constituents such as emulsifiers, catalysts residues and the like. These extraneous materials are removed together with the water when the coagulum is separated off and any remaining residues can be washed out by means of water. It is also stated that the properties of the isolated rubbers are not adversely affected if a calcium salt is used for coagulation. Rather, it is said that a rubber whose vulcanizate properties are not impaired and are fully satisfactory is obtained. This is presented as surprising since it is said that impairment of the rubber properties is frequently observed when polymers are precipitated from dispersions by means of polyvalent metal ions such as calcium or aluminium ions. Houben-Weyl (1961), Methoden der Org. Chemie, Makromolekulare Stoffe 1, pp. 484/485, is offered as evidence for the last statement. In contrast, the rubbers of DE-A 27 51 786 display no slowing or worsening of, for example, the initial vulcanization and/or full vulcanization.

None of the documents DE-A 23 32 096, DE-A 24 25 441 and DE-A 27 51 786 disclose which measures have to be taken in order to achieve rapid vulcanization and good vulcanizate properties.

As in the case of the above-described patents, the object of DE-A 30 43 688, is also to achieve a large reduction in the amounts of electrolyte required for coagulation of the latex. According to the teachings of DE-A 30 43 688, this is achieved by using either plant-based protein-like materials or polysaccharides such as starch and if appropriate water-soluble polyamine compounds as auxiliaries in addition to the inorganic coagulate in the electrolyte coagulation of latices. As inorganic coagulates, preference is given to alkali metal or alkaline earth metal salts. The specific additives make it possible to achieve a reduction in the amounts of salts used for quantitative coagulation of the latex. DE-A 3 043 688 gives no information as to how rapid vulcanization can be achieved as a result of the production and/or work-up of the nitrile rubber.

According to U.S. Pat. No. 2,487,263, the coagulation of the latex of styrene-butadiene rubber is not carried out using metal salts but by means of a combination of sulphuric acid with gelatin ("glue"). The amount and concentration of the sulphuric acid are selected so that the pH of the aqueous medium is set to a value of <6. It is stated that it is advantageous for discrete rubber crumbs which are not coherent and can readily be filtered off and can readily be washed to be formed in the coagulation of the latex. Styrene-butadiene rubber obtained according to the teaching of U.S. Pat. No. 2,487,263 has a lower water absorption capacity, a lower ash content and a higher electrical resistance than rubbers coagulated by means of metal salts. U.S. Pat. No. 2,487,263 does not disclose what effects the coagulation using sulphuric acid and gelatin has on storage stability, vulcanization rate and vulcanizate properties, in particular the modulus, of rubbers. In-house experiments have found that the storage stability of the nitrile rubbers obtained in this way is not satisfactory.

In U.S. Pat. No. 4,920,176, it is stated and evidenced by experimental data that very high sodium, potassium and calcium contents are obtained in coagulation of a nitrile rubber latex according to the prior art using inorganic salts such as sodium chloride or calcium chloride. Moreover, considerable amounts of emulsifier also remain in the nitrile rubber. This is undesirable and, according to U.S. Pat. No. 4,920,176, water-soluble cationic polymers are used instead of inorganic salts in the coagulation of nitrile rubber latices for the purpose of significantly reducing the amounts of salt remaining in the nitrile rubber. The water-soluble cationic polymers are, for example, ones based on epichlorohydrin and dimethylamine. The vulcanizates obtained therefrom display lower swelling on storage in water and an increased electrical resistance. In the patent text, the property improvements mentioned are attributed purely qualitatively to the minimal cation contents remaining in the product. A more detailed explanation of the phenomena observed is not given. In U.S. Pat. No. 4,920,176, there is also no information as to whether and how the vulcanization behaviour and the modulus can be controlled by the production and work-up of the nitrile rubber.

The objective of EP-A-1 369 436 is to provide nitrile rubbers having a high purity. In order to produce the nitrile rubbers, the emulsion polymerization is carried out in the presence of fatty acid and/or resin acid salts as emulsifiers, then coagulation of the latex is carried out by means of addition of acids with pH values of 6 or less, optionally with addition of precipitants. As acids, it is possible to use all mineral and organic acids which allow the desired pH values to be set. As additional precipitant, it is possible to use, for example, alkali metal salts of inorganic acids. Furthermore, it is mentioned but not demonstrated experimentally that precipitation auxiliaries such as gelatin, polyvinyl alcohol, cellulose, carboxylated cellulose and cationic and anionic polyelectrolytes or mixtures thereof can also be added. The fatty and resin acids formed here are subsequently washed out by means of aqueous alkali metal hydroxide solutions and the polymer is finally subjected to shear until a residual moisture content of less than 20% is obtained. This results in nitrile rubbers having very low residue emulsifier contents and low cation contents in the form of sodium, potassium, magnesium and calcium contents. EP-A-1 369 436 gives no information on the desired production of nitrile rubbers which have rapid vulcanization and a high modulus after the vulcanization. In particular, EP-A-1 369 436 does not give any indication of what factors (for example, the content of various cations) influence the overall vulcanization rate, the property profile and in this case especially the modulus and the storage stability.

EP-A-0 692 496, EP-A-0 779 301 and EP-A-0 779 300 in each case describe nitrile rubbers based on an unsaturated nitrile and a conjugated diene. All the nitrile rubbers contain 10-60% by weight of unsaturated nitrile and have a Mooney viscosity in the range 15-150 or, according to EP-A-0 692 496, in the range 15-65 and all have at least 0.03 mol of $C_{12}$-$C_{16}$-alkylthio group per 100 mol of monomer units, with this alkylthio group having at least three tertiary carbon atoms and a sulphur atom which is bound directly to at least one of the tertiary carbon atoms.

The nitrile rubbers are in each case produced in the presence of a $C_{12}$-$C_{16}$-alkyl thiol having a corresponding structure as molecular weight regulator which functions as "chain transfer agent" and is thus incorporated as end group into the polymer chains.

In the case of the nitrile rubbers of EP-A-0 779 300, it is stated that they have a width "ΔAN" (AN=acrylonitrile) of the composition distribution of the unsaturated nitrile in the copolymer in the range from 3 to 20. The process for producing them differs from that of EP-A-0 692 496 in that only 30-80% by weight of the total amount of monomers is used at the beginning of the polymerization and the remaining amount of monomers is fed in only at a conversion of the polymerization of 20-70% by weight.

In the case of the nitrile rubbers of EP-A-0 779 301, it is stated that they contain 3-20% by weight of a fraction having a low molecular weight and a number average molecular weight $M_n$ of less than 35 000. The process for producing them differs from that of EP-A-0 692 496 in that only 10-95% by weight of the alkyl thiol are mixed into the monomer mixture before the polymerization and the remaining amount of the alkyl thiol is fed in only after a polymerization conversion of 20-70% by weight has been reached.

With regard to the coagulation of the latex, all three patent applications EP-A-0 692 496, EP-A-0 779 301 and EP-A-0

779 300 state that any coagulants can be used. As inorganic coagulant, calcium chloride, aluminium sulphate and sodium chloride are used.

In Comparative example 6 of EP-A-779 300 or Comparative example 7 of EP-A-0 779 301, the coagulation of the latex is carried out using a mixture of NaCl and CaCl$_2$, with the CaCl$_2$ being used in large amounts and the weight ratio of NaCl and CaCl$_2$ being 1:0.75. With respect to the scorch time and the modulus at 100% elongation, no significant differences are found in comparison to the other examples mentioned in the respective Tables 12 and 13.

According to EP-A-0 692 496, EP-A-0 779 300 and EP-A-0 779 301, it is essential to use alkyl thiols in the form of the compounds 2,2,4,6,6-pentamethylheptane-4-thiol and 2,2,4,6,6,8,8-heptamethylnonane-4-thiol as molecular weight regulators for the production of the nitrile rubbers. It is clearly pointed out here that the use of the conventional known tert-dodecyl mercaptan as regulator gives nitrile rubbers having poorer properties.

In the case of the nitrile rubbers produced in EP-A-0 692 496, EP-A-0 779 300 and EP-A-0 779 301, it is stated that they have an advantageous property profile, good processability of the rubber mixtures and make low fouling of the mould possible during processing. The vulcanizates obtained are said to have a good combination of low-temperature resistance and oil resistance and possess good mechanical properties. It is also stated that high polymerization conversions of greater than 75%, preferably greater than 80%, in the production of the nitrile rubbers enable a high productivity to be achieved and the vulcanization rate in vulcanization using sulphur or peroxides is high, in particular in the case of NBR grades for injection moulding. It is also indicated that the nitrile rubbers have a short initial vulcanization time and a high crosslinking density. As evidence of the rapid vulcanization of the nitrile rubbers produced according to EP-A-0 692 496, EP-A-0 779 300 and EP-A-0 779 301, the initial vulcanization time (known as the "scorch time" (measured as "$T_5$")) is presented, although this is merely a measure of the initial vulcanization rate. Nothing is said about the overall vulcanization rate and how this may be able to be influenced. The crosslinking density is described only by quotation of the maximum torque value (measured as $V_{max}$).

In practice, short scorch times are not always desirable, since the corresponding rubber mixtures cannot be processed reliably because of such a fast initial vulcanization. Particularly in injection moulding, rapid initial vulcanization is not satisfactory. Short cycle times are critical for economical processing. To achieve short cycle times, the difference between full vulcanization rate and initial vulcanization rate is, however, critical. This is measured as "$t_{90}$-$t_{10}$", with $t_{90}$ being the time at which 90% of the final vulcanization has taken place and $t_{10}$ is the time at which 10% of the final vulcanization has taken place. However, use of the regulators 2,2,4,6,6-pentamethylheptane-4-thiol and 2,2,4,6,6,8,8-heptamethylnonane-4-thiol used in EP-A-0 692 496, EP-A-0 779 300 and EP-A-0 779 301 does not necessarily make setting of rapid vulcanization characteristics and setting of a high modulus possible.

On this subject, EP-A-0 692 496 indicates, inter alia, that many methods have already been proposed for setting high vulcanization rates, e.g. the use of minimal amounts of emulsifiers and precipitants, so that only minimal amounts of emulsifiers and precipitants remain in the NBR.

Three as yet unpublished patent applications with the numbers DE 102007024011, DE 102007024008 and DE 102007024010 describe nitrile rubbers which have particular properties.

DE 10 2007 024011 describes a rapidly vulcanizing nitrile rubber having good mechanical properties, in particular a high modulus 300 value, which has an ion index ("II") according to the general formula (I) in the range from 7 to 26 ppm×mol/g. The ion index is defined as follows:

$$\text{ion index} = \frac{3c(\text{Ca}^{2+})}{40 \text{ g/mol}} - \left[\frac{c(\text{Na}^+)}{23 \text{ g/mol}} + \frac{c(\text{K}^+)}{39 \text{ g/mol}}\right] \quad (I)$$

where $c(\text{Ca}^{2+})$, $c(\text{Na}^+)$ and $c(\text{K}^+)$ indicate the concentrations of the calcium, sodium and potassium ions in the nitrile rubber in ppm. The nitrile rubbers produced according to the invention which are mentioned in the examples have Ca ion contents in the range 325-620 ppm and Mg ion contents in the range 14-22 ppm. The nitrile rubbers which are not according to the invention in the examples have Ca ion contents in the range 540-1290 ppm and Mg ion contents of 2-34 ppm. To obtain such a rapidly vulcanizing nitrile rubber, the coagulation is carried out in the presence of a salt of a monovalent metal and at the same time a maximum of 5% by weight of a salt of a divalent metal and the temperature during coagulation and subsequent washing is at least 50° C.

DE 10 2007 024008 describes a particularly storage-stable nitrile rubber which contains 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups and has a calcium ion content of at least 150 ppm, preferably ≥200 ppm based on the nitrile rubber and a chlorine content of at least 40 ppm, based on the nitrile rubber. The Ca ion contents of the nitrile rubbers produced in the examples according to the invention are 171-1930 ppm and the Mg contents are in the range from 2 to 265 ppm. The Ca ion contents of the comparative examples which are not according to the invention are 2-25 ppm, and the Mg ion contents of the comparative examples which are not according to the invention are 1-350 ppm and those of the examples according to the invention are 2 to 265 ppm. Such a storage-stable nitrile rubber is obtained when the coagulation of the latex is carried out in the presence of at least one salt based on aluminium, calcium, magnesium, potassium, sodium or lithium and the coagulation or washing is carried out in the presence of a Ca salt or of washing water containing Ca ions and in the presence of a Cl-containing salt.

DE 10 2007 024010 describes a further fast-vulcanizing nitrile rubber which has an ion index ("II") according to the general formula (II) in the range 0-60 ppm×mol/g, preferably 10-25 ppm×mol/g, $$II = 3\left[\frac{c(\text{Ca}^{2+})}{40 \text{ g/mol}} + \frac{c(\text{Mg}^{2+})}{24 \text{ g/mol}}\right] - \left[\frac{c(\text{Na}^+)}{23 \text{ g/mol}} + \frac{c(\text{K}^+)}{39 \text{ g/mol}}\right] \quad (II)$$

where $c(\text{Ca}^{2+})$, $c(\text{Mg}^{2+})$, $c(\text{Na}^+)$, and $c(\text{K}^+)$ indicate the concentration of the calcium, magnesium, sodium and potassium ions in the nitrile rubber in ppm, and has an Mg ion content of 50-250 ppm based on the nitrile rubber. In the examples for the nitrile rubbers produced according to the invention, the Ca ion content $c(\text{Ca}^{2+})$ is in the range 163-575 ppm and the Mg ion content $c(\text{Mg}^{2+})$ is in the range 57-64 ppm. In the examples for nitrile rubbers which are not according to the invention, the Ca ion content $c(\text{Ca}^{2+})$ is in the range 345-1290 ppm and the Mg ion content $c(\text{Mg}^{2+})$ is in the range 2-440 ppm. To obtain such nitrile rubbers, the coagulation of the latex has to be carried out with adherence to particular measures. In particular, the latex is set to a temperature of less than 45° C. before coagulation using a magnesium salt.

In summary, there is still a need for further optimization of the coagulation of the latex and a need for improved nitrile rubbers despite the existing prior art.

It is therefore an object of the present invention to carry out the coagulation of nitrile rubber latices using small amounts of precipitant so that quantitative precipitation of the latex without fines occurs (i.e. to give a clear serum). Furthermore, it would be desirable for no excessively large rubber crumbs (without latex or precipitant inclusions) to be formed here and the amounts of emulsifier remaining in the product to be low (equivalent to a high COD burden in the latex serum and in the wastewater). A further object is to provide a nitrile rubber which is not only stable on storage but at the same time has a vulcanization rate, in particular low differences between full vulcanization rate and initial vulcanization rate ($t_{90}$-$t_{10}$), and good mechanical properties, in particular a high modulus.

It has surprisingly been found that nitrile rubbers having good storage stability and at the same time a high vulcanization rate ($t_{90}$-$t_{10}$) and also excellent vulcanizate properties are obtained when they have a specific content of calcium and magnesium ions.

The present invention accordingly provides a nitrile rubber which contains repeating units of at least one α,β-unsaturated nitrile, at least one conjugated diene and optionally one or more further copolymerizable monomers and has magnesium ions in a concentration in the range from 100-180 ppm and calcium ions in a concentration in the range from 50-145 ppm, in each case based on the nitrile rubber.

These nitrile rubbers according to the invention have excellent storage stability, at the same time make a high vulcanization rate (characterized by the difference between full vulcanization time and initial vulcanization time ($t_{90}$-$t_{10}$)) possible and have good vulcanizate properties, in particular high values of the modulus.

Such nitrile rubbers have not been known hitherto from the prior art.

Determination of the Cation Contents

To determine the cation contents according to the present invention, the following method has proven itself and is used: 0.5 g of the nitrile rubbers are digested by dry ashing at 550° C. in a platinum crucible with subsequent dissolution of the ash in hydrochloric acid. After appropriate dilution of the digestion solution with deionized water, the metal contents can be determined by ICP-OES (inductively coupled plasma—optical emission spectrometry) at the following wavelengths:

| | |
|---|---|
| Calcium: | 317.933 nm, |
| Potassium: | 766.491 nm, |
| Magnesium: | 285.213 nm, |
| Sodium: | 589.592 nm | against calibration solutions matched to the acid matrix. Depending on the concentration of the elements in the digestion solution and the sensitivity of the measuring instrument used, the concentrations of the sample solutions are matched to the linear region of the calibration for the respective wavelengths used (B. Welz "Atomic Absorption Spectrometry", 2nd Ed., Verlag Chemie, Weinheim 1985).

The nitrile rubbers of the invention have a concentration of magnesium ions $c(Mg^{2+})$ in the range from 100-180 ppm, preferably in the range from 100-170 and a concentration of the Ca ions $c(Ca^{2+})$ in the range from 50-145 ppm, preferably 55-120 ppm, in each case based on the nitrile rubber.

In a preferred embodiment, the nitrile rubbers of the invention have an ion index ("II") according to the general formula (I) shown below in the range from 5-30 ppm×g/mol, particularly preferably from 10-25 ppm×g/mol, $$II = 3\left[\frac{c(Ca^{2+})}{40 \text{ g/mol}} + \frac{c(Mg^{2+})}{24 \text{ g/mol}}\right] - \left[\frac{c(Na^+)}{23 \text{ g/mol}} + \frac{c(K^+)}{39 \text{ g/mol}}\right] \quad (1)$$

where $c(Ca^{2+})$, $g^{2+}$), $c(Na^+)$, and $c(K^+)$ indicate the concentration of the calcium, magnesium, sodium and potassium ions in the nitrile rubber in ppm. These concentrations of the calcium, magnesium, sodium and potassium ions are determined as described above.

In the ion index according to the formula (I), the metal ion contents are divided by the atomic weights of the respective metals. For this reason, the II has the dimensions [ppm×mol/g].

Storage Stability of a Nitrile Rubber

The nitrile rubbers of the invention advantageously have a very good storage stability and have only a few impurities, in particular of the emulsifier used in the polymerization, which is reflected in high COD values of the washing water.

For the purposes of the present invention, storage stability of a rubber refers to a very constant molecular weight or Mooney viscosity over a relatively long period of time, in particular also at elevated temperatures.

The storage stability is usually determined by storing the unvulcanized nitrile rubber for a defined period of time at elevated temperature (also referred to as hot air storage) and determining the difference in the Mooney viscosities before and after this storage at elevated temperature. Since the Mooney viscosity of nitrile rubber usually increases on hot air storage, the characterization of the storage stability is carried out by the difference in Mooney viscosity after storage minus Mooney viscosity before storage.

The storage stability "SS" is thus given by the formula (II)

$$SS = MV2 - MV1 \quad (II)$$

where
MV1 is the value of the Mooney viscosity of a nitrile rubber and
MV2 is the value of the Mooney viscosity of the same nitrile rubber after storage for 48 hours at 100° C.

The determination of the values of the Mooney viscosity (ML 1+4@100° C.) is in each case carried out by means of a shear disc viscometer in accordance with DIN 53523/3 or ASTM D 1646 at 100° C.

It has been found to be useful to carry out the 48 hour storage of the nitrile rubber of the invention at 100° C. in a convection drying oven in which the oxygen content is unchanged compared to normal air.

A nitrile rubber is sufficiently stable on storage when the storage stability SS is not more than 5 Mooney units. The SS is preferably less than 5 Mooney units, particularly preferably not more than 4 Mooney units.

Impurities in the Nitrile Rubber

The amount of emulsifier remaining in the nitrile rubber is determined indirectly by determination of the soluble organic constituents present in the aqueous phase after coagulation of the latex. The measure used for this is the COD (chemical oxygen demand) in accordance with DIN 38 409, part 41, H 41-1 and H 41-2 of the latex serum. In the COD determination, organic constituents are oxidized quantitatively by means of potassium dichromate strongly acidified with sulphuric acid in the presence of a silver sulphate catalyst. The amount of unreacted potassium dichromate is subsequently backtitrated with iron(II) ions. The COD is reported in $mg_{oxygen}$/liters of solution or $g_{oxygen}$/liters of solution in the DIN standard. To improve comparability of experiments in which latices having different solids concentrations or different volumes of precipitants are used, the COD of the serum is divided by the mass of the nitrile rubber. In this case, the COD has the dimensions $g_{oxygen}/kg_{NBR}$. This value is obtained in the following way:

$$COD_{NBR} = \frac{COD_{serum} \times (m_{serum} + m_{pr})}{m_{NBR}}$$

$$COD_{NBR} = \frac{COD_{serum} \times (1 - SC/100 + m_{pr})}{SC/100}$$

where:
$COD_{NBR}$: COD based on 1 kg of NBR ($g_{oxygen}/kg_{NBR}$)
$COD_{serum}$: COD of the serum (determined experimentally) [$g_{oxygen}/kg_{serum}$]
$m_{serum}$: mass of the serum in 1 kg of latex [kg]
$m_{pr}$: mass of the precipitant used [kg/kg$_{latex}$]
$m_{NBR}$: mass of the nitrile rubber in 1 kg of latex [kg]
SC: solids content of the latex (% by weight}

The COD is a measure of the amount of low molecular weight constituents, in particular the emulsifiers used in the polymerization, present in the latex serum after coagulation of the latex. The higher the COD based on NBR in coagulation experiments starting out from identical latices, the lower the content of emulsifiers and other impurities in the nitrile rubber.

Nitrile Rubbers According to the Invention

The nitrile rubbers of the invention have repeating units of at least one α,β-unsaturated nitrile, at least one conjugated diene and optionally one or more further copolymerizable monomers.

The conjugated diene can have any nature. Preference is given to using ($C_4$-$C_6$)-conjugated dienes. Particular preference is given to 1,3-butadiene, isoprene, 2,3-dimethylbutadiene, piperylene, 1,3-pentadiene or mixtures thereof. In particular, 1,3-butadiene or isoprene or mixtures thereof are used. Very particular preference is given to 1,3-butadiene.

As α,β-unsaturated nitrile, it is possible to use any known α,β-unsaturated nitrile; preference is given to ($C_3$-$C_5$)-α,β-unsaturated nitriles such as acrylonitrile, methacrylonitrile, 1-chloroacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the α,β-unsaturated nitrile, one or more further copolymerizable monomers, e.g. α,β-unsaturated monocarboxylic or dicarboxylic acids, their esters or amides, can be additionally used.

As α,β-unsaturated monocarboxylic or dicarboxylic acids, it is possible to use, for example, fumaric acid, maleic acid, acrylic acid, methacrylic acid, crotonic acid and itaconic acid.

Preference is given to maleic acid, acrylic acid, methacrylic acid and itaconic acid. Such nitrile rubbers are customarily also referred to as carboxylated nitrile rubbers, or "XNBRs" for short.

As esters of α,β-unsaturated carboxylic acids, use is made of, for example, alkyl esters, alkoxyalkyl esters, hydroxyalkyl esters or mixtures thereof.

Particularly preferred alkyl esters of α,β-unsaturated carboxylic acids are methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate and lauryl(meth)acrylate. In particular, n-butyl acrylate is used.

Particularly preferred alkoxyalkyl esters of α,β-unsaturated carboxylic acids are methoxyethyl(meth)acrylate, ethoxyethyl(meth)acrylate and methoxyethyl(meth)acrylate. In particular, methoxyethyl acrylate is used.

Particularly preferred hydroxyalkyl esters of α,β-unsaturated carboxylic acids are hydroxyethyl(meth)acrylate, hydroxypropyl(meth)acrylate and hydroxybutyl(meth)acrylate.

Further esters of α,β-unsaturated carboxylic acids which can be used are, for example, polyethylene glycol(meth)acrylate, polypropylene glycol(meth)acrylate, glycidyl(meth)acrylate, epoxy(meth)acrylate and urethane(meth)acrylate.

Further possible monomers are vinylaromatics such as styrene, α-methylstyrene and vinylpyridine.

The proportions of conjugated diene and α,β-unsaturated nitrile in the nitrile rubbers of the invention can vary within a wide range. The proportion of the conjugated diene or of the sum of conjugated dienes is usually in the range from 20 to 95% by weight, preferably in the range from 40 to 90% by weight, particularly preferably in the range from 60 to 85% by weight, based on the total polymer. The proportion of the α,β-unsaturated nitrile or of the sum of α,β-unsaturated nitriles is usually from 5 to 80% by weight, preferably from 10 to 60% by weight, particularly preferably from 15 to 40% by weight, based on the total polymer. The proportions of the monomers in each case add up to 100% by weight.

The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitriles are replaced by proportions of these additional monomers, with the proportions of all monomers continuing to add up to 100% by weight.

If esters of (meth)acrylic acid are used as additional monomers, they are usually used in amounts of from 1 to 25% by weight.

If α,β-unsaturated monocarboxylic or dicarboxylic acids are used as additional monomers, they are usually used in amounts of less than 10% by weight.

The nitrogen content of the nitrile rubbers of the invention is determined by the Kjeldahl method in accordance with DIN 53 625. Owing to the content of polar comonomers, the nitrile rubbers are usually soluble in methyl ethyl ketone to an extent of ≥85% by weight at 20° C.

The nitrile rubbers generally have Mooney viscosities (ML (1+4 @100° C.)) of from 10 to 150, preferably from 20 to 100, Mooney units. The Mooney viscosity (ML (1+4 @100° C.)) is determined at 100° C. by means of a shear disc viscosimeter in accordance with DIN 53523/3 or ASTM D 1646.

The glass transition temperatures of the nitrile rubbers are generally in the range from −70° C. to +10° C., preferably in the range from −60° C. to 0° C.

Preference is given to nitrile rubbers according to the invention which comprise repeating units of acrylonitrile, 1,3-butadiene and optionally of one or more further copolymerizable monomers. Preference is likewise given to nitrile rubbers having repeating units of acrylonitrile, 1,3-butadiene and one or more α,β-unsaturated monocarboxylic or dicarboxylic acids, their esters or amides, and in particular repeating units of an alkylester of an α,β-unsaturated carboxylic acid, very particularly preferably of methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate or lauryl(meth)acrylate.

The present invention further provides a process for producing nitrile rubbers by emulsion polymerization of at least one α,β-unsaturated nitrile, at least one conjugated diene and optionally one or more further copolymerizable monomers in the presence of at least one molecular weight regulator, with the latex containing the nitrile rubber which is obtained in the polymerization being subjected to coagulation and the coagulated nitrile rubber subsequently being washed, characterized in that (i) the latex obtained in the emulsion polymerization has a pH of at least 6 before the coagulation,
(ii) the coagulation of the latex is carried out using at least one magnesium salt as precipitant, with optionally up to 40% by weight of the magnesium salt being replaced by a calcium salt,
(iii) gelatin is used as coprecipitant for the coagulation of the latex,
(iv) the temperature of the latex is set to a temperature of not more than 50° C. before contact with the coprecipitant (iii) and the temperature is subsequently increased to 100° C. and
(v) the coagulation of the latex and/or work-up of the coagulated latex is carried out using water containing calcium ions if the coagulation is carried out in the absence of a calcium salt as precipitant.

The nitrile rubbers are produced by emulsion polymerization in the process of the invention.

Emulsion polymerizations are carried out using emulsifiers. A wide range of emulsifiers is known and available to a person skilled in the art for this purpose. As emulsifiers, it is possible to use, for example, anionic emulsifiers or uncharged emulsifiers. Preference is given to using anionic emulsifiers, particularly preferably in the form of water-soluble salts.

As anionic emulsifiers, it is possible to use modified resin acids which are obtained by dimerization, disproportionation, hydrogenation and modification of resin acid mixtures containing abietic acid, neoabietic acid, palustric acid, laevopimaric acid. A particularly preferred modified resin acid is disproportionated resin acid (Ullmann's Encyclopedia of Industrial Chemistry, 6th Edition, Volume 31, pp. 345-355).

It is also possible to use fatty acids as anionic emulsifiers. These contain from 6 to 22 carbon atoms per molecule. They can be fully saturated or have one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as caster oil, cottonseed oil, peanut oil, linseed oil, coconut oil, palm kernel oil, olive oil, rapeseed oil, soybean oil, fish oil and beef tallow, etc. (Ullmann's Encyclopedia of Industrial Chemistry, 6th Edition, Volume 13, pp. 75-108). Preferred carboxylic acids are derived from coconut fatty acid and from beef tallow and are partially or fully hydrogenated.

Such carboxylic acids based on modified resin acids or fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are aliphatic radicals, aromatic radicals, alkylated aromatics, fused aromatics and methylene-bridged aromatics, with the methylene-bridged and fused aromatics being able to be additionally alkylated. The length of the alkyl chains is from 6 to 25 carbon atoms. The length of the alkyl chains bound to the aromatics is from 3 to 12 carbon atoms.

The sulphates, sulphonates and phosphates are used as lithium, sodium, potassium and ammonium salts. The sodium, potassium and ammonium salts are preferred.

Examples of such sulphonates, sulphates and phosphates are Na laurylsulphate, Na-alkylsulphonate, Na-alkylarylsulphonate, Na salts of methylene-bridged aryl sulphonates, Na salts of alkylated naphthalenesulphonates and the Na salts of methylene-bridged naphthalenesulphonates which can also be oligomerized, with the degree of oligomerization being in the range from 2 to 10. The alkylated naphthalenesulphonic acids and the methylene-bridged (and optionally alkylated) naphthalenesulphonic acids are usually present as mixtures of isomers which can also contain more than 1 sulphonic acid group (from 2 to 3 sulphonic acid groups) in the molecule. Particular preference is given to Na laurylsulphate, Na alkylsulphonate mixtures having from 12 to 18 carbon atoms, Na alkylarylsulphonates, Na diisobutylene-naphthalenesulphonate, methylene-bridged polynaphthalenesulphonate mixtures and methylene-bridged arylsulphonate mixtures.

Uncharged emulsifiers are derived from addition products of ethylene oxide and of propylene oxide onto compounds having a sufficiently acidic hydrogen. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone but in combination with anionic emulsifiers.

Preference is given to the Na and K salts of disproportionated abietic acid and of partially hydrogenated tallow fatty acid and also mixtures thereof, sodium laurylsulphate, Na alkylsulphonates, sodium alkylbenzenesulphonate and also alkylated and methylene-bridged naphthalenesulfonic acids.

The emulsifiers are used in an amount of from 0.2 to 15 parts by weight, preferably from 0.5 to 12.5 parts by weight, particularly preferably from 1.0 to 10 parts by weight, per 100 parts by weight of the monomer mixture.

The emulsion polymerization is carried out using the emulsifiers mentioned. If latices which due to some instability tend to premature self-coagulation are obtained after the polymerization, the emulsifiers mentioned can also be used for after-stabilization of the latices. This can, in particular, be necessary before removal of unreacted monomers by treatment with steam or before storage of the latex.

Molecular Weight Regulators

To regulate the molecular weight of the nitrile rubber formed, use is made of at least one molecular weight regulator.

The regulator is usually used in an amount of from 0.01 to 3.5 parts by weight, preferably from 0.05 to 2.5 parts by weight, per 100 parts by weight of the monomer mixture.

To set the molecular weight, it is possible to use mercaptan-containing carboxylic acids, mercaptan-containing alcohols, xanthogen disulphides, thiuram disulphides, halogenated hydrocarbons, branched aromatic or aliphatic hydrocarbons and also linear or branched mercaptans. These compounds usually have from 1 to 20 carbon atoms (see Rubber Chemistry and Technology (1976), 49(3), 610-49 (Uraneck, C.A.): "Molecular weight control of elastomers prepared by emulsion polymerization" and D. C. Blackley, Emulsion Polymerization, Theory and Practice, Applied Science Publishers Ltd London, 1975, pp. 329-381).

Examples of mercaptan-containing alcohols and mercaptan-containing carboxylic acids are monothioethylene glycol and mercaptopropionic acid.

Examples of xanthogen disulphides are di ethylxanthogen disulphide, diethylxanthogen disulphide and diisopropylxanthogen disulphide.

Examples of thiuram disulphides are tetramethylthiuram disulphide, tetraethylthiuram disulphide and tetrabutylthiuram disulphide.

Examples of halogenated hydrocarbons are carbon tetrachloride, chloroform, methyl iodide, diodomethane, difluorodiiodomethane, 1,4-diiodobutane, 1,6-diiodohexane, ethyl bromide, ethyl iodide, 1,2-dibromotetrafluoroethane, bromotrifluoroethene, bromodifluoroethene.

Examples of branched hydrocarbons are those from which an H free radical can easily be split off. Examples are toluene, ethylbenzene, cumene, pentaphenylethane, triphenylmethane, 2,4-diphenyl-4-methyl-1-pentene, dipentene and also terpenes such as limonene, α-pinene, β-pinene, α-carotene and β-carotene.

Examples of linear or branched mercaptans are n-hexyl mercaptan or else mercaptans which contain 12-16 carbon atoms and at least three tertiary carbon atoms, with the sulphur being bound to one of these tertiary carbon atoms. These mercaptans are preferred and can be used either individually or in mixtures. Suitable mercaptans are, for example, the addition compounds of hydrogen sulphide onto oligomerized propene, in particular tetrameric propene, or onto oligomerized isobutene, in particular rimeric isobutene, which are frequently referred to as tertiary dodecyl mercaptan ("t-DDM") in the literature.

Such alkyl thiols or (isomer) mixtures of alkyl thiols are either commercially available or can be prepared by a person skilled in the art using methods which are adequately described in the literature (see, for example, JP 07-316126, JP 07-316127 and JP 07-316128 and also GB 823,823 and GB 823,824).

An example of an alkyl thiol which comes within the above definition is 2,2,4,6,6,8,8-pentamethylheptane-4-thiol.

Use may also be made of a mixture of $C_{12}$-mercaptans containing
2,2,4,6,6-pentamethylheptane-4-thiol,
2,4,4,6,6-pentamethylheptane-2-thiol,
2,3,4,6,6-pentamethylheptane-2-thiol and
2,3,4,6,6-pentamethylheptane-3-thiol,
which together with a process for preparing it is described in German Patent Application DE 10 2007 024009. This specific mixture can be obtained by reaction of hydrogen sulphide with triisobutene at temperatures in the range from 0° C. to −60° C. in a continuous process in which
(a) the hydrogen sulphide is subjected to drying before the reaction,
(b) the triisobutene used has a water content of not more than 70 ppm,
(c) boron trifluoride is used as catalyst in amounts of not more than 1.5% by weight, based on the triisobutene used,
(d) the reaction is carried out in the absence of compounds which form complexes with boron trifluoride and
(e) the reaction mixture is brought into contact with an aqueous alkali solution after the reaction to remove the catalyst.

The individual alkyl thiols and/or mixtures thereof are generally used in an amount of from 0.05 to 3 parts by weight, preferably from 0.1 to 1.5 parts by weight, per 100 parts by weight of the monomer mixture.

The molecular weight regulator or molecular weight regulator mixture is introduced either at the beginning of the polymerization or else in portions during the polymerization, with preference being given to addition of all or individual components of the regulator mixture in portions during the polymerization.

Owing to its function, the molecular weight regulator is to a certain extent present in the form of end groups in the nitrile rubber. Thus if, for example, an alkyl thiol or a mixture of alkyl thiols is used, the nitrile rubber has a certain amount of alkyl thiol end groups. When the above-described specific mixture of $C_{12}$-mercaptans is used, these end groups are thus the corresponding thiol end groups of the thiols present in the regulator mixture, i.e. 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups. The nitrile rubber in this case preferably has 2,2,4,6,6-pentamethylheptane-4-thio, 2,4,4,6,6-pentamethylheptane-2-thio, 2,3,4,6,6-pentamethylheptane-2-thio and 2,3,4,6,6-pentamethylheptane-3-thio end groups.

Initiation of the emulsion polymerization is typically carried out using polymerization initiators which disintegrate into free radicals (free radical polymerization initiators). As such initiators include compounds which contain an —O—O—unit (peroxo compounds) or an —N═N-unit (azo compound).

The peroxo compounds include hydrogen peroxide, peroxodisulphates, peroxodiphosphates, hydroperoxides, peracids, peracid esters, peracid anhydrides and peroxides having two organic radicals. Suitable salts of peroxodisulphuric acid and of peroxodiphosphoric acid are the sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, bis-2,4-dichlorobenzoyl peroxide, di-t-butyl peroxide, dicumyl peroxide, t-butyl perbenzoate, t-butyl peracetate, etc. Suitable azo compounds are azobisisobutyronitrile, azobisvaleronitrile and azobiscyclohexanenitrile.

Hydrogen peroxide, hydro peroxides, peracids, peracid esters, peroxodisulphate and peroxodisphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Initiator systems consisting of an oxidizing agent and a reducing agent are referred to as redox systems. When redox systems are employed, salts of transition metals such as iron, cobalt or nickel are frequently also used in combination with suitable complexing agents such as sodium ethylenediaminetetraacetate, sodium nitrilotriacetate and trisodium phosphate or tetrapotassium diphosphate.

Preferred redox systems are: 1) potassium peroxodisulphate in combination with triethanolamine, 2) ammonium peroxodiphosphate in combination with sodium metabisulphite ($Na_2S_2O_5$), 3) p-methane hydroperoxide/sodium formaldehydesulphoxylate in combination with Fe(II) sulphate ($FeSO_4 * 7\ H_2O$), sodium ethylenediaminoacetate and trisodium phosphate, 4) cumene hydroperoxide/sodium formaldehydesulphoxylate in combination with Fe(II) sulphate ($FeSO_4 * 7\ H_2O$), sodium ethylenediaminoacetate and tetrapotassium disphosphate.

The amount of oxidizing agent is from 0.001 to 1 part by weight per 100 parts by weight of monomer. The molar amount of reducing agent is in the range from 50% to 500%, based on the molar amount of the oxidizing agent used.

The molar amount of complexing agents is based on the amount of transition metal used and is usually equimolar with this.

To carry out the polymerization, all or individual components of the initiator system are introduced at the beginning of the polymerization or during the polymerization.

The addition of all or individual components of the activator system in portions during the polymerization is preferred. The sequential addition enables the reaction rate to be controlled.

The polymerization time is in the range from 5 h to 15 h and depends essentially on the acrylonitrile content of the monomer mixture and on the polymerization temperature.

The polymerization temperature is in the range from 0 to 30° C., preferably in the range from 5 to 25° C.

After conversions in the range from 50 to 90%, preferably in the range from 70 to 85%, have been reached, the polymerization is stopped.

For this purpose, a stopper is added to the reaction mixture. Suitable stoppers are, for example, dimethyl dithiocarbamate, Na nitrite, mixtures of dimethyl dithiocarbamate and Na nitrite, hydrazine and hydroxylamine and also salts derived therefrom, e.g. hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol or phenothiazine.

The amount of water used in the emulsion polymerization is in the range from 100 to 900 parts by weight, preferably in the range from 120 to 500 parts by weight, particularly preferably in the range from 150 to 400 parts by weight, of water per 100 parts by weight of the monomer mixture.

To reduce the viscosity during the polymerization, to adjust the pH and also as pH buffer, salts can be added to the aqueous phase in the emulsion polymerization. Typical salts are salts of monovalent metals in the form of potassium and sodium hydroxide, sodium sulphate, sodium carbonate, sodium hydrogencarbonate, sodium chloride and potassium chloride. Preference is given to sodium and potassium hydroxide, sodium hydrogencarbonate and potassium chloride.

The amounts of these electrolytes are in the range from 0 to 1 part by weight, preferably from 0 to 0.5 part by weight, per 100 parts by weight of the monomer mixture.

The polymerization can be carried out either batchwise or continuously in a cascade of stirred vessels.

To achieve a uniform course of the polymerization, only part of the initiator system is used to start the polymerization and the remainder is fed in during the polymerization. The polymerization is usually started using from 10 to 80% by weight, preferably 30-50% by weight, of the total amount of initiator. The introduction of individual constituents of the initiator system after commencement of the polymerization is also possible.

If chemically uniform products are to be produced, further acrylonitrile or butadiene is introduced when the composition goes outside the azeotropic butadiene/acrylonitrile ratio. Further introduction is preferably the case in the case of NBR grades having acrylonitrile contents of from 10 to 34 and in the case of grades containing from 40 to 50% by weight of acrylonitrile (W. Hofmann, Rubber Chem. Technol. 36 (1963) 1). The further introduction is, as indicated, for example, in DD 154 702, preferably carried out under computer control on the basis of a computer program.

To remove unreacted monomers and volatile constituents, the stopped latex is subjected to a steam distillation. Here, temperatures in the range from 70° C. to 150° C. are employed, with the pressure being reduced at temperatures of <100° C.

Before removal of the volatile constituents, the latex can be after-stabilized by means of an emulsifier. For this purpose, it is advantageous to use the abovementioned emulsifiers in amounts of from 0.1 to 2.5% by weight, preferably from 0.5 to 2.0% by weight, per 100 parts by weight of nitrile rubber.

Before or during coagulation of the latex, one or more ageing inhibitors can be added to the latex. Phenolic, amine and other ageing inhibitors are suitable for this purpose.

Suitable phenolic ageing inhibitors are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioethers, 2,2'-methylenebis(4-methyl-6-tert-butylphenol) (BPH) and sterically hindered thiobisphenols.

If discoloration of the rubber is of no importance, amine ageing inhibitors, e.g. mixtures of diaryl-p-phenylenediamines (DTPD), octylated diphenylamine (ODPA), phenyl-α-naphthylamine (PAN), phenyl-β-naphthylamine (PBN), preferably ones based on phenylenediamine, are also used. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), etc.

The other ageing inhibitors include phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic ageing inhibitors. TMQ, MBI and MMBI are used particularly for NBR grades which are vulcanized peroxidically.

Coagulation of the Latex

The coagulation of the latex in the process of the invention is carried out using at least one magnesium salt as precipitant, with optionally up to 40% by weight of the magnesium salt being replaced by a calcium salt. At the same time, the coagulation of the latex and/or work-up of the coagulated latex can be carried out using water containing calcium ions; this is important if the coagulation is carried out using only one magnesium salt as precipitant.

Suitable magnesium salts are, for example, magnesium chloride, magnesium sulphate and magnesium nitrate. Preference is given to using magnesium chloride or magnesium sulphate or mixtures thereof. Up to 40% by weight of the magnesium salt can optionally be replaced by at least one calcium salt, preferably calcium chloride or calcium nitrate. A mixture of at least 60% by weight of magnesium chloride and a maximum of 40% by weight of calcium chloride is also particularly suitable.

The coagulation of the latex is usually carried out using from 0.1 to 10% by weight, preferably from 0.3 to 5% by weight, of the magnesium salt, based on nitrile rubber.

The salt concentration of the magnesium salt solution or of the solution containing magnesium and calcium salts is usually from 0.1 to 35% by weight, preferably from 0.5 to 30% by weight, particularly preferably from 5 to 25% by weight.

The aqueous solution of the magnesium salt can be produced using deionized water or water which has not been deionized and thus contains calcium ions.

Optionally, up to 15% by weight of an alkali metal salt can also be present in the total amount of the precipitant. However, this is in no way imperative.

Coprecipitant Gelatin

Apart from the above-described precipitants, it is important for gelatin to be used as coprecipitant in the process of the invention.

Gelatin is a mixture of polypeptides which, depending on the way in which it is obtained, has molar masses of from about 13 500 to 500 000 (determined by SDS gel electrophoresis or gel chromatography). Gelatin is obtained primarily by more or less extensive hydrolysis of the collagen present in pig skin, in the dermis of cattle/calves and also the bones thereof. A description of gelatin and its production may be found in Ullmanns Enzyklopadie der Technischen Chemie, 4th edition, Volume 12, Verlag Chemie, Weinheim-New York/1976), pp. 211-220. Gelatin is commercially available as granules, leaf gelatin and as a solution. The amino acid composition corresponds largely to that of the collagen from which it has been obtained and comprises, with the exception of tryptophan and methionine, all essential amino acids; the main amino acid is hydroxyproline. Gelatin contains 84-90% of protein and 2-4% of mineral materials plus water to 100%.

A distinction is made between two methods of production: the "acid process" gives acid-ashed gelatins and the "alkaline process" gives alkaline-ashed gelatins. The raw material for the acid-asked gelatins (predominantly pig skin and rind) is subjected to an acid digestion process for a number of days. In the production of alkaline-ashed gelatin, the dermis (intermediate layer between the leather and the subcutaneous tissue) of cattle or bones are treated with alkali for 10-20 days.

All types of gelatin are suitable for use as coprecipitants in the coagulation of the latex, with grades having high molar masses, in particular those having a viscosity of >10 cP in a 10% strength aqueous solution, being particularly suitable.

The gelatin is used in an amount of from 10 ppm to 2% by weight, preferably from 30 ppm to 0.5% by weight, particularly preferably from 50 to 1000 ppm, based on the nitrile rubber.

For coagulating the latex, the gelatin is preferably dissolved in the aqueous solution of the precipitant, i.e. the solution of the magnesium salt. The precipitant solution usually contains from 0.1 to 35% by weight of the magnesium salt, with from 0.1 to 30% by weight being preferred and 5-25% by weight being particularly preferred. The gelatin concentration in the precipitant solution is in the range from 0.001 to 3% by weight, preferably in the range from 0.01 to 1% by weight.

The latex having a pH of at least 6, preferably >6, is used for the coagulation. If appropriate, this pH is set by addition of a base, preferably ammonia or sodium hydroxide or potassium hydroxide. In the process of the invention, acids are not used in the coagulation of the latex.

The latex used for the coagulation advantageously has a solids concentration in the range from 1% to 40%, preferably in the range from 5% to 35% and particularly preferably in the range from 15 to 30% by weight.

The coagulation of the latex is carried out continuously or batchwise. Preference is given to continuous coagulation carried out with the aid of nozzles.

In one embodiment of the process of the invention, the gelatin-containing solution of the magnesium salt is added to the latex. As an alternative, the latex can also be initially charged and the gelatin-containing salt solution can be added to the latex.

Both in the batchwise and continuous coagulation of the latex, it has been found to be useful to set the temperature of the latex to a value of not more than 50° C., preferably <50° C., particularly preferably <40° C., before contact with the gelatin and to heat the mixture to a temperature of up to 100° C., preferably to a temperature in the range from 77 to 100° C. after contact. In this way, it is unexpectedly possible to reduce the amount of salt necessary for quantitative coagulation of the latex and increase the amount of impurities which go into the serum during coagulation of the latex. Furthermore, the proportion of fines resulting during the coagulation of the latex is reduced, and coarser particles which can be filtered off having diameters of >5 mm are formed.

Washing of the Coagulated Nitrile Rubber:

After the coagulation, the nitrile rubber is usually present in the form of crumb. The washing of the coagulated NBR is therefore also referred to as crumb washing. It is possible to use either deionized water, (also abbreviated to "DW"), or water which has not been deionized, also abbreviate to "BW"), for washing this coagulated crumb. Water which has not been deionized contains calcium ions.

If the coagulation of the latex is carried out using a magnesium salt in combination with gelatin without up to 40% by weight of the magnesium salt being replaced by a calcium salt, the corresponding specific calcium content is introduced into the nitrile rubber in one of the following two ways: either water which has not been deionized and thus contains Ca ions is used in the washing of the coagulated NBR or water which has not been deionized and thus contains calcium ions is used for producing the precipitant solution. It is also possible to combine the two measures with one another.

Washing is carried out at a temperature in the range from 15 to 90° C., with a temperature in the range from 45 to 90° C. being preferred.

The amount of washing water is from 0.5 to 500 parts by weight, preferably from 1 to 300 parts by weight, per 100 parts by weight of nitrile rubber.

The rubber crumb is preferably subjected to multistage washing, with the rubber crumb being partially dewatered between the individual washing stages. The residual moisture contents of the crumb between the individual washing stages are in the range from 5 to 100% by weight, preferably in the range from 7 to 50% by weight. The number of washing stages is usually from 1 to 7, preferably from 1 to 3. Washing is carried out batchwise or continuously. Preference is given to using a multistage, continuous process, with countercurrent washing being preferred in order to save water.

Dewatering and Drying

After washing is complete, the nitrile rubber crumb is typically dewatered. This is usually carried out in two stages. In the first stage, the rubber crumb is subjected to preliminary mechanical dewatering. In the second stage, the remaining water is evaporated. Both preliminary dewatering and drying are preferably carried out continuously. Suitable apparatuses for the preliminary mechanical dewatering are strainer screws in which the water is squeezed out laterally via a strainer slit or screws in which mechanical dewatering is effected against the product stream (Welding principle).

The cation contents remaining in the nitrile rubber can be additionally influenced if desired by the degree of preliminary mechanical dewatering. This is not compulsory, but can be advantageous particularly when inefficient washing is employed. Efficient washing gives the appropriate cation contents immediately after washing. The water contents after preliminary mechanical dewatering are in the range from 5 to 25% by weight. To adjust the cation mix remaining in the product, it has been found to be useful for the water contents after preliminary mechanical dewatering to be from 5 to 15% by weight, in particular from 5 to 10% by weight.

Drying of the nitrile rubber which has been subjected to preliminary dewatering is carried out in a fluidized-bed dryer or in a plate dryer. The temperatures during drying are in the range from 80 to 150° C. Preference is given to drying according to a temperature programme, with the temperature being reduced towards the end of the drying process.

The nitrile rubbers of the invention which have the stated specific calcium and magnesium content surprisingly have the desired high storage stability SS of a maximum of 5 Mooney units. The high storage stability has positive effects as early as during the drying of the nitrile rubber, since otherwise a certain unwanted ageing of the rubber takes place during this drying. The high storage stability aids the setting of a prescribed target Mooney viscosity. As a result, the amount of out-of-specification nitrite rubber is reduced. Furthermore, the high storage stability results in a reduction in complaints due to a change in the Mooney viscosity during long storage or transport times. The rubbers of the invention are suitable for the reproducible production of vulcanizable mixtures. The mouldings which can be obtained therefrom by vulcanization thus also display a reproducible mechanical and physical property profile.

In addition to the good stability on storage, nitrile rubbers of the invention also have the desired high vulcanization rate (difference of initial vulcanization time minus full vulcanization time) and the vulcanizates obtained have a very good modulus.

The invention therefore also provides for the use of the nitrile rubbers of the invention for producing vulcanizable mixtures containing at least one nitrite rubber according to the invention, at least one crosslinker and optionally further additives.

These vulcanizable mixtures are produced by mixing at least one nitrile rubber according to the invention, at least one crosslinker and optionally further additives.

As crosslinker, it is possible to use, for example, peroxidic crosslinkers such as bis(2,4-dichlorobenzyl) peroxide, dibenzoyl peroxide, bis(4-chlorobenzoyl) peroxide, 1,1-bis-(t-butylperoxy)-3,3,5-trimethylcyclohexane, tert-butyl perbenzoate, 2,2-bis(t-butylperoxy)butene, 4,4-di-tert-butylperoxynonyl valerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous to use not only these peroxidic crosslinkers but also further additives by means of which the crosslinking yield can be increased: suitable additives of this type are, for example, triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-phenylenedimaleimide.

The total amount of the crosslinker or crosslinkers is usually in the range from 1 to 20 phr, preferably in the range from 1.5 to 15 phr and particularly preferably the range from 2 to 10 phr, based on the nitrile rubber.

It is also possible to use sulphur in elemental soluble or insoluble form or sulphur donors as crosslinker.

Possible sulphur donors are, for example, dimorpholyl disulphide (DTDM), 2-morpholino-dithiobenzothiazol (MBSS), caprolactam disulphide, dipentamethylenethiuram tetrasulphide (DPTT), and tetramethylthiuram disulphide (TMTD).

In the sulphur vulcanization of the nitrile rubbers of the invention, too, it is possible to use further additives by means of which the crosslinking yield can be increased. However, crosslinking can in principle also be carried out using sulphur or sulphur donors alone.

Conversely, crosslinking of the nitrile rubbers of the invention can also be carried out only in the presence of the abovementioned additives, i.e. without addition of elemental sulphur or sulphur donors.

Suitable additives by means of which the crosslinking yield can be increased are, for example, dithiocarbamates, thiurams, thiazoles, sulphenamides, xanthogenates, guanidine derivatives, caprolactams and thiourea derivatives.

As dithiocarbamates, it is possible to use, for example: ammonium dimethyldithiocarbamate, sodium diethyldithiocarbamate (SDEC), sodium dibutyldithiocarbamate (SDBC), zinc dimethyl-dithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyl-dithiocarbamate, nickel dimethyldithiocarbamate and zinc diisononyldithiocarbamate.

As thiurams, it is possible to use, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

As thiazoles, it is possible to use, for example: 2-mercaptobenzothiazole (MBT), dibenzthiazyl disulphide (MBTS), zinc mercaptobenzothiazole (ZMBT) and copper-2-mercaptobenzothiazole.

As sulphenamide derivatives, it is possible to use, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxy-ethylenesulphenamide.

As xanthogenates, it is possible to use, for example: sodium dibutylxanthogenate, zinc isopropyl-dibutylxanthogenate and zinc dibutylxanthogenate.

As guanidine derivatives, it is possible to use, for example: diphenylguanidine (DPG), di-o-tolylguanidine (DOTG) and o-tolylbiguanide (OTBG).

As dithiophosphates, it is possible to use, for example: zinc dialkyldithiophosphate (chain length of the alkyl radicals: $C_2$ to $C_{16}$), copper dialkyldithiophosphates (chain length of the alkyl radicals: $C_2$ to $C_{16}$) and dithiophosphoryl polysulphide.

As caprolactam, it is possible to use, for example, dithio-bis-caprolactam.

As thiourea derivatives, it is possible to use, for example, N,N'-diphenylthiourea (DPTU), diethylthiourea (DETU) and ethylenethiourea (ETU).

Further suitable additives are, for example: zinc diamine-diisocyanate, hexamethylenetetramine, 1,3-bis(citraconimidomethyl)benzene and cyclic disulphanes Both the additives mentioned and the crosslinkers can be used either individually or in mixtures. Preference is given to using the following substances for crosslinking the nitrile rubbers: sulphur, 2-mercaptobenzothiazol, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinkers and abovementioned additives can each be used in amounts of from about 0.05 to 10 phr, preferably from 0.1 to 8 phr, in particular from 0.5 to 5 phr (single addition, in each case based on the active substance).

In sulphur crosslinking according to the invention, it may also be useful to employ further inorganic or organic substances in addition to the crosslinkers and abovementioned additives. Examples of such further substances are: zinc oxide, zinc carbonate, lead oxide, magnesium oxide, calcium oxide, saturated or unsaturated organic fatty acids and their zinc salts, polyalcohols, amino alcohols such as triethanolamine and also amines such as dibutylamine, dicyclohexylamine, cyclohexylethylamine and polyether amines.

In addition, it is also possible to use initial vulcanization inhibitors. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

Apart from the addition of the crosslinker or crosslinkers, the nitrile rubber of the invention can also be mixed with further customary rubber additives.

These include, for example, the typical substances which are adequately known to those skilled in the art, for example fillers, filler activators, ozone protection agents, ageing inhibitors, antioxidants, processing aids, extender oils, plasticizers, reinforcing materials and mould release agents.

As fillers, it is possible to use, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Possible filler activators are, in particular, organic silanes such as vinyltrimethyloxysilane, vinyldimethoxymethylsilane, vinyltriethoxysilane, vinyltris(2-methoxyethoxy)silane, N-cyclo-hexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10 000 g/mol. The amount of filler activators is usually from 0 to 10 phr, based on 100 phr of the nitrile rubber.

As ageing inhibitors, it is possible to add those which have already been described in the present application in respect of coagulation of the latex to the vulcanizable mixtures. These are usually used in amounts of about 0-5 phr, preferably from 0.5 to 3 phr, based on 100 phr of the nitrile rubber.

Possible mould release agents are, for example: saturated and partially unsaturated fatty acids and oil acids and their derivatives (fatty acid esters, fatty acid salts, fatty alcohols, fatty acid amides), which are preferably employed as constituents of the mixture, also products which can be applied to the mould surface, for example products based on low molecular weight silicone compounds, products based on fluoropolymers and products based on phenolic resins.

When used as constituents of the mixture, the mould release agents are used in amounts of about 0-10 phr, preferably from 0.5 to 5 phr, based on 100 phr of the nitrile rubber.

Reinforcement by means of strength carriers (fibres) composed of glass, according to the teachings of U.S. Pat. No. 4,826,721, is also possible as is reinforcement by means of cords, woven fabrics, fibres composed of aliphatic and aromatic polyamides (Nylon®, Aramid®), polyesters and natural fibre products.

The invention further provides a process for producing mouldings based on at least one nitrile rubber according to the invention, which is characterized in that the above-described vulcanizable mixture is vulcanized in a shaping process, preferably using injection-moulding.

The invention thus likewise provides the shaped part which can be obtained by the abovementioned vulcanization process.

This process makes it possible to produce a large number of mouldings, e.g. a seal, a cap, a hose or a diaphragm. The nitrile rubbers of the invention having the specific ion index are particularly suitable for producing an O-ring seal, a flat seal, a corrugated sealing ring, a sealing sleeve, a sealing cap, a dust protection cap, a plug seal, a thermalinsulation hose (with or without addition of PVC), an oil cooler hose, an air intake hose, a servo control hose or a pump diaphragm.

As an alternative to the direct production of mouldings based on the nitrile rubber of the invention, it is also possible for the production of the nitrile rubber of the invention to be followed by either (i) a metathesis reaction or (ii) a metathesis reaction and a subsequent hydrogenation or (iii) only a hydrogenation. These metathesis and hydrogenation reactions are both adequately known to those skilled in the art and are described in the literature.

The metathesis is known, for example, from WO-A-02/100941 and WO-A-02/100905.

A hydrogenation can be carried out using homogeneous or heterogeneous hydrogenation catalysts. It is also possible to carry out the hydrogenation in situ, i.e. in the same reaction vessel in which, if appropriate, the metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can, for example, be achieved in the presence of a rhodium- or ruthenium-containing catalyst. It is possible to use, for example, a catalyst of the general formula $$(R^1_m B)_l MX_n$$

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3P)_4RhH$ and the corresponding compounds in which the triphenylphosphine has been completely or partly replaced by tricyclohexylphosphine. The catalyst can be used in small amounts. An amount in the range 0.01-1% by weight, preferably in the range from 0.03-0.5% by weight and particularly preferably in the range 0.1-0.3% by weight, based on the weight of the polymer, is suitable.

It is normally useful to use the catalyst together with a cocatalyst which is a ligand of the formula $R^1_m B$, where $R^1$, m and B are as defined above for the catalyst. Preference is given to m being 3, B being phosphorus and the radicals $R^1$ can be identical or different. Preference is given to cocatalysts having trialkyl, tricycloalkyl, triaryl, triaralkyl, diaryl monoalkyl, diaryl monocyclo-alkyl, dialkyl monoaryl, dialkyl monocycloalkyl, dicycloalkyl monoaryl or dicycloalkyl monoaryl radicals.

Examples of cocatalysts may be found, for example, in U.S. Pat. No. 4,631,315. A preferred cocatalyst is triphenylphosphine. The cocatalyst is preferably used in amounts in the range 0.3-5% by weight, preferably in the range 0.5-4% by weight, based on the weight of the nitrile rubber to be hydrogenated. Preference is also given to the weight ratio of the rhodium-containing catalyst to the cocatalyst being in the range from 1:3 to 1:55, particularly preferably in the range from 1:5 to 1:45. Based on 100 parts by weight of the nitrile rubber to be hydrogenated, it is useful to employ from 0.1 to 33 parts by weight of the cocatalyst, preferably from 0.5 to 20 parts by weight and very particularly preferably from 1 to 5 parts by weight, in particular more than 2 but less than 5 parts by weight.

The practical procedure for this hydrogenation is adequately known to a person skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of at least 50%, preferably 70-100%, particularly preferably 80-100%, of the double bonds present in the starting nitrile rubber.

When heterogeneous catalysts are used, they are usually supported catalysts based on palladium which are supported on, for example, carbon, silica, calcium carbonate or barium sulphate.

The optionally hydrogenated nitrile rubbers obtained by metathesis and/or hydrogenation reaction of the nitrile rubbers of the invention can be introduced in a manner analogous to the nitrile rubbers of the invention into vulcanizable compositions and used for producing vulcanizates and mouldings based on such vulcanizates. These optionally hydrogenated nitrile rubbers have Mooney viscosities (ML (1+4 @ 100° C.)) of from 1 to 50, preferably from 1 to 40, Mooney units.

The Mooney viscosity (ML (1+4@100° C.)) is determined by a shear disc viscometer in accordance with DIN 53523/3 or ASTM D 1646 at 100° C.

EXAMPLES

General Information

I Determination of the Cation Contents

To determine the cation contexts, 0.5 g of the nitrile rubbers were digested by dry ashing at 550° c. in a platinum crucible with subsequent distillation of the ash in hydrochloric acid. After appropriate dilution of the digestion solution with deionized water, the metal contents are measured by ICP-OES (inductively coupled plasma—optical emission spectrometry) at the following wavelengths:

Calcium: 317.933 nm,
Magnesium: 285.213 nm,
Potassium: 766.491 nm, and
Sodium: 589.592 nm
against calibration solutions matched to the acid matrix. Depending on the concentration of the elements in the digestion solution and the sensitivity of the measuring instrument used, the concentrations of the sample solutions were matched to the linear region of the calibration for the wavelengths used in each case (B. Welz "Atomic Absorption Spectrometry", 2nd Ed., Verlag Chemie, Weinheim 1985, chapters 9.1, 9.1.1, 9.1.2 and 9.1.3; pp. 251-262)

II Storage Stability

The dried NBR rubbers are characterized by the Mooney viscosity before and after hot air storage for 48 hours at 100° C., i.e. the Mooney viscosity was determined once directly after drying (i.e. before hot air storage) and also subsequently after hot air ageing for 48 hours at 100° C.

III Initial Vulcanization Behaviour and Vulcanization Rate

The initial vulcanization behaviour (Mooney scorch) is determined at 120° C. by means of a shear disc viscosimeter in accordance with DIN 53 523. A small rotor (S) is used for the determination. "MS 5 (120° C.)" is the time in minutes during which the Mooney value increases by 5 Mooney units from the minimum value.

The vulcanization rate is determined at 160° C. in accordance with DIN 53 529, part 3, by means of a rheometer from Monsanto (MDR 2000E) as the difference $t_{90}$-$t_{10}$, where $t_{10}$ and $t_{90}$ are the vulcanization times at which 10% and 90%, respectively, of the finale degree of vulcanization are attained.

IV Mechanical Properties

The mechanical properties of the rubbers (e.g. stress at various elongations, ultimate tensile strength and elongation at break) are determined on vulcanizates in accordance with DIN 53 504.

VI Chlorine Content

The chlorine content of the nitrile rubbers of the invention is determined as follows by a method based on DIN EN 14582, method A: the nitrile rubber sample is digested in a melt of sodium peroxide and potassium nitrate in a Parr pressure vessel. Sulphite solution is added to the resulting melt and the mixture is acidified with sulphuric acid. In the solution obtained, the chloride formed is determined by potentiometric titration with silver nitrate solution and calculated as chlorine.

Where the abbreviation "RT" is used below in the tables for examples or comparative examples, this is a temperature of 20° C.+/−2° C.

A NBR Production by Emulsion Polymerization

An NBR latex was produced on the basis of the formulations shown in Table 1 below. Amounts of all starting materials are given in parts by weight per 100 parts by weight of the monomer mixture. The polymerization was carried out at a temperature of 18° C. for a period of 10 hours until a polymerization conversion of 80% had been reached.

TABLE 1

| Latex production | Parts by weight |
|---|---|
| Butadiene | 65 |
| Acrylonitrile | 35 |
| Total amount of water | 200 |
| Erkantol ® BXG[1] | 3.67 |
| Baykanol ® PQ[2] | 1.10 |
| K salt of coconut fatty acid | 0.73 |
| KOH | 0.05 |
| t-DDM[7] | 0.24/0.24 |
| Potassium peroxodisulphate[3] | 0.39/0.20 |
| Tris(α-hydroxyethyl)amine[4] | 0.57 |
| Na dithionite[5] | 1.0 |
| Diethylhydroxylamine | 0.5 |
| Potassium hydroxide | 1.28 |
| Vulkanox ® KB[6] | 1.25 |

[1]Sodium salt of a mixture of monosulphonated and disulphonated naphthalenesulphonic acids having isobutylene oligomer substituents (Erkantol ® BXG)
[2]Sodium salt of methylenebisnaphthalene sulphonate (Baykanol ® PQ, Lanxess Deutschland GmbH)
[3]Aldrich catalogue number: 21,622-4
[4]Aldrich catalogue number: T5,830-0
[5]Aldrich catalogue number: 15,795-3
[6]2,6-di-tert-butyl-p-cresol from Lanxess Deutschland GmbH
[7]t-DDM (tertiary dodecyl mercaptan): $C_{12}$-mercaptan mixture from Lanxess Deutschland GmbH If two numerical values are given in one of the columns in Table 1 above, this means that the total amount of the respective starting material was not added in a single portion, but instead a first part was introduced at the beginning of the polymerization and a further part was added later. The reactions in which this subsequent addition was carried out are indicated below.

The NBR latex was produced batchwise in a 2 m³ autoclave provided with a stirrer. 350 kg of the monomer mixture and a total amount of water of 700 kg were used in the batch. The emulsifiers Erkantol® BXG (12.85 kg), Baykanol® PQ (3.85 kg) and the potassium salt of coconut fatty acid (2.56 kg) and 17.5 g of potassium hydroxide together with 600 kg of the water were placed in the autoclave and flushed by means of a stream of nitrogen. After the nitrogen flushing was complete, the destabilized monomers (227.5 kg of butadiene and 122.5 kg of acrylonitrile) and part of the regulator t-DDM (0.84 kg) were introduced into the reactor. Thereafter, the reactor was closed. The remaining amount of water (100 kg) was used for preparing the aqueous solutions of tris(α-hydroxyethyl) amine, potassium peroxodisulphate and stopper solution. The polymerization was started at 18° C. by addition of aqueous solutions of 1.365 kg of potassium peroxodisulphate (corresponding to the 0.39 part by weight shown in Table 1) and 2.0 kg of tris(α-hydroxyethyl)amine (corresponding to the 0.57 part by weight shown in Table 1) and the polymerization mixture was maintained at this temperature over the entire polymerization time. The course of the polymerization was followed by gravimetric determinations of the conversion. At a polymerization conversion of 15%, a further 0.84 kg of regulator t-DDM (corresponding to the 0.24 part by weight shown in Table 1) and 0.7 kg of potassium peroxodisulphate (corresponding to the 0.2 part by weight shown in Table 1) were introduced. When a conversion of 80% had been reached (10h), the polymerization was stopped by addition of an aqueous solution of sodium dithionite/(N,N-diethylhydroxylamine (DEHA) and potassium hydroxide. Unreacted monomers and other volatile constituents were removed by means of steam distillation.

Characteristic data of the latex obtained in this way are summarized in Table 2 below.

TABLE 2

| | |
|---|---|
| Particle diameter ($d_{50}$) [nm] | 34 |
| Solids content [% by weight] | 23.9 |
| pH value | 11.7 |
| Acrylonitrile content [% by weight] | 34.1% |

Before coagulation, aliquot of the NBR latex were admixed with different amounts of 2,2'-methylenebis(4-methyl-6-tert-butylphenol) (Vulkanox® BKF from Lanxess Deutschland GmbH). The added amounts of Vulkanox® BKF were between 0.1 and 0.8 phr based on NBR solids and are given in Tables 4) and 5). A 50% strength dispersion of Vulkanox® BKF in water was used for this.

The Vulkanox® BKF dispersion was based on the following formulation, with the preparation being carried out at 95-98° C. by means of an Ultraturrax:

| | |
|---|---|
| 360 g | of deionized water (DW water) |
| 40 g | of alkylphenol polyglycol ether (Emulgator NP ® 10 from Lanxess Deutschland GmbH) |
| 400 g | of Vulkanox ® BKF from Lanxess Deutschland GmbH |

To set the Vulkanox® BKF contents specified in the tables, different amounts of the BKF dispersion were added to the NBR latex. By further addition of different amounts of deionized water, the solids content of the NBR latex was set to 23.79% in all cases.

B Work-Up of the Latex

The concentration of the salt solution and the amounts of salt used for the precipitation were in each case calculated without water of crystallization. The salts used in the coagulation of the latex, the concentration of the salt solutions, the amounts of salt used based on the NBR, the coagulation temperature, the temperature during washing and the duration of washing are listed in the following tables.

The grades of gelatin used were procured from the gelatin factory formerly Koepff & Sohne/Heilbronn. The characteristic parameters for the various gelatin grades used in the experiments, e.g. type of gelatin ashing ("acid" or "alkaline"), isoelectric point (IEP) and viscosity of 10% strength solutions in water, are based on manufacturer's data.

To produce the gelatin solutions, the gelatin was firstly swollen in water for ½-1 h at room temperature and then dissolved with heating. The addition of the magnesium salt and if appropriate calcium salt was in each case carried out after complete dissolution of the gelatin.

In the 1st trial (Table 3), the influence of the gelatin grade on its coagulation activity was examined. In the reference experiment C1 which was not according to the invention, in which no gelatin was used, an amount of magnesium chloride of 1.5% by weight was required for quantitative coagulation of the latex. In the case of the experiment C2 which was not according to the invention, the amount of magnesium chloride used (0.85% by weight) was not sufficient for a quantitative coagulation of the latex. The experiments shown in Table 3 were then carried out using a constant amount of magnesium chloride of 0.85% by weight of $MgCl_2$. In the case of this amount of magnesium chloride, the amount of gelatin necessary for quantitative coagulation of the latex was determined in each case. For the experiments, 250 g of latex which had been stabilized with 0.8 phr of Vulkanox® BKF were used in each case. The concentration of the magnesium chloride solution was in each case 20% by weight. The gelatin-containing magnesium chloride solutions were added at room temperature to the latex which was then heated while stirring to 90° C. The results of these experiments are summarized in Table 3.

TABLE 3

1st trial (Comparative experiments C1 and C2 and Examples 3-9 according to the invention)
Coagulation of the latex using various gelatin grades

| | Gelatin grade | | | Precipitation conditions | | | | |
|---|---|---|---|---|---|---|---|---|
| Example | Type of ashing | Isoelectric point | Viscosity in water (10% strength solution) [cP] | Precipitant | Amount of salt based on NBR [% by wt.] | Amount of gelatin based on NBR [ppm] | Temperature of the latex on addition of salt [° C.] | Temperature of the crumb dispersion after heating [° C.] |
| C1[1)] | — | — | — | $MgCl_2$ | 1.5 | — | RT | 90 |
| C2[2)] | — | — | — | $MgCl_2$ | 0.85 | — | RT | 90 |
| 3 | acid | 8.7 | 92.1 | $MgCl_2$/gelatin | 0.85 | 85 | RT | 90 |
| 4 | acid | 8.5 | 66.2 | $MgCl_2$/gelatin | 0.85 | 400 | RT | 90 |
| 5 | acid | 7.6 | 28.1 | $MgCl_2$/gelatin | 0.85 | 500 | RT | 90 |
| 6 | acid | 6.7 | 17.8 | $MgCl_2$/gelatin | 0.85 | 800 | RT | 90 |

TABLE 3-continued

1st trial (Comparative experiments C1 and C2 and Examples 3-9 according to the invention)
Coagulation of the latex using various gelatin grades

| | Gelatin grade | | | Precipitation conditions | | | |
|---|---|---|---|---|---|---|---|
| Example | Type of ashing | Isoelectric point | Viscosity in water (10% strength solution) [cP] | Precipitant | Amount of salt based on NBR [% by wt.] | Amount of gelatin based on NBR [ppm] | Temperature of the latex on addition of salt [°C.] | Temperature of the crumb dispersion after heating [°C.] |
| 7 | alkaline | 4.9 | 36 | MgCl$_2$/gelatin | 0.85 | 500 | RT | 90 |
| 8 | alkaline | 4.9 | 21.9 | MgCl$_2$/gelatin | 0.85 | 800 | RT | 90 |
| 9 | alkaline | 4.6 | 8.4 | MgCl$_2$/gelatin | 0.85 | 1000 | RT | 90 |

[1] Comparative experiment with an amount of MgCl$_2$ sufficient for a quantitative coagulation of the latex
[2] Comparative experiment with an amount of MgCl$_2$ insufficient for a quantitative coagulation of the latex The 1st trial (Table 3) shows that with all grades of gelatin (ashed by acidic or alkaline means), even at low added amounts, it is possible to compensate for the amount of salt which is insufficient for quantitative coagulation of the latex and that gelatin grades having a high molar mass (high viscosity in water) as coprecipitants under the selected conditions lead to slightly better results than gelatin grades having a low molar mass.

In further trials, larger amounts of latex were coagulated and examined. The amounts of precipitant (using gelatin in the experiments according to the invention) were in each case designed with the aid of preliminary experiments so that coagulation of the latex was quantitative and the rubber crumbs formed in the coagulation of the latex were larger than 5 mm so that they were not carried away by the stream of washing water during the subsequent washing of the crumb.

25 kg of latex were in each case worked up to give the solid. The coagulation of the latex was carried out batchwise in a stirrable, open vessel having a capacity of 100 l. Here, the latex was initially placed in the coagulation vessel, then heated to the temperatures stated in Tables 4 and 5, column 6 (if this was necessary), then the aqueous salt solution was added with stirring at this temperature and then the reaction mixture was heated to the temperatures stated in Tables 4 and 5 in column 7

The 100 l coagulation vessel was provided with an inlet and an outlet for washing of the crumb. Two rails were installed on the inside of the vessel so that the outlet could be shut off by means of a sieve (mesh opening: 2 mm) before the washing was carried out, so that the coagulated crumb was not swept out during washing. Washing was carried out using a constant water throughput of 200 l/h. Both deionized water (DW) and normal mains water containing calcium ions ("BW") was used for washing (see Tables 4 and 5).

After the coagulation of the latex was complete, the rubber crumb was separated off from the serum by means of a sieve and washed under the conditions (washing type, washing temperature, washing time etc.) shown in Tables 4 and 5.

Water which had not been deionized, i.e. Ca-water, was used for producing the salt solutions and the gelatin-containing salt solutions in Examples 10 to 17 according to the invention and in the Comparative Examples C18 to C38 which were not according to the invention.

In Example 16 according to the invention, deionized water (DW) was used.

Precipitant solution 1) consisted of a 10% strength MgCl$_2$ solution containing 0.1% by weight of acid-ashed gelatin (viscosity in 10% strength aqueous solution: 92.1 cP; isoelectric point: 8.7).

Precipitant solution 2) consisted of a 10% strength MgCl$_2$ solution containing 0.3% by weight of acid-ashed gelatin (viscosity in 10% strength aqueous solution: 92.1 cP; isoelectric point: 8.7).

Precipitant solution 3) consisted of a 10% strength salt solution containing 0.3% by weight of acid-ashed gelatin (viscosity in 10% strength aqueous solution: 92.1 cP; isoelectric point: 8.7). The salt consisted of 70% of anhydrous MgCl$_2$ salt and 30% of anhydrous CaCl$_2$. Deionized water was used for producing this precipitant solution.

Precipitant solution 4) consisted of a 10% strength MgSO$_4$ solution containing 0.3% by weight of acid-ashed gelatin (viscosity in 10% strength aqueous solution: 92.1 cP; isoelectric point: 8.7).

TABLE 4

2nd trial (Examples 10-17 according to the invention)
Coagulation of the latex with addition of gelatin
(Concentration of the precipitant solutions in each case 10% by weight)

| | | | Precipitation conditions | | | | Washing conditions | | |
|---|---|---|---|---|---|---|---|---|---|
| | Vulkanox ® | | Amount of salt based on NBR | Amount of gelatin based on NBR | Temperature of the latex on addition of the salt | Temperature of the crumb dispersion after heating | | | |
| Example | BKF [phr] | Precipitant | [% by wt.] | NBR [ppm] | [°C.] | [°C.] | Type of water | T [°C.] | Time [h] |
| 10 | 0.1 | MgCl$_2$/Gelatin[1] | 0.85 | 85 | RT | 75 | BW | 60 | 8.0 |
| 11 | 0.2 | MgCl$_2$/Gelatin[1] | 0.85 | 85 | 35 | 60 | BW | 60 | 8.0 |

TABLE 4-continued

2nd trial (Examples 10-17 according to the invention)
Coagulation of the latex with addition of gelatin
(Concentration of the precipitant solutions in each case 10% by weight)

| | | | Precipitation conditions | | | | Washing conditions | | |
|---|---|---|---|---|---|---|---|---|---|
| Example | Vulkanox ® BKF [phr] | Precipitant | Amount of salt based on NBR [% by wt.] | Amount of gelatin based on NBR [ppm] | Temperature of the latex on addition of the salt [° C.] | Temperature of the crumb dispersion after heating [° C.] | Type of water | T [° C.] | Time [h] |
| 12 | 0.3 | MgCl$_2$/Gelatin[2)] | 0.65 | 195 | RT | 90 | BW | 60 | 8.0 |
| 13 | 0.5 | MgCl$_2$/Gelatin[2)] | 0.65 | 195 | RT | 70 | BW | 60 | 8.0 |
| 14 | 0.5 | MgCl$_2$/Gelatin[2)] | 0.65 | 195 | RT | 85 | BW | 60 | 8.0 |
| 15 | 0.8 | MgCl$_2$/Gelatin[2)] | 0.65 | 195 | RT | 80 | BW | 60 | 8.0 |
| 16 | 0.8 | MgCl$_2$/CaCl$_2$/Gelatin[3)] | 1.13 | 339 | RT | 90 | BW | 90 | 4.0 |
| 17 | 0.8 | MgSO$_4$/Gelatin[4)] | 0.76 | 228 | RT | 90 | DW | 60 | 5.0 |

[1)]Use of precipitant solution 1)
[2)]Use of precipitant solution 2)
[3)]Use of precipitant solution 3)
[4)]Use of precipitant solution 4)

TABLE 5

3rd trial (Examples C18 to C38 which are not according to the invention)

| | | | Precipitation conditions | | | | | Washing conditions | | |
|---|---|---|---|---|---|---|---|---|---|---|
| Example | Vulkanox BKF [phr] | Precipitant | Coprecipitant (type and amount based on NBR) | Conc. of the electrolyte solution [% by weight] | Amount of electrolyte based on NBR [% by weight] | Temperature of the latex on addition of the salt [° C.] | Temperature of the crumb dispersion after heating [° C.] | Type of water | T [° C.] | Time [h] |
| C 18 | 0.1 | NaCl | — | 26 | 33 | RT | 80 | BW | 60 | 8.0 |
| C 19 | 0.1 | CaCl$_2$ | — | 30 | 3.4 | 40 | 80 | BW | 60 | 8.0 |
| C 20 | 0.2 | NaCl | — | 26 | 33 | 40 | 70 | BW | 60 | 8.0 |
| C 21 | 0.2 | CaCl$_2$ | — | 30 | 2.0 | 40 | 90 | BW | 60 | 8.0 |
| C 22 | 0.2 | CaCl$_2$ | — | 30 | 3.4 | 40 | 75 | BW | 60 | 8.0 |
| C 23 | 0.3 | NaCl | — | 26 | 33 | 60 | 60 | BW | 60 | 8.0 |
| C 24 | 0.3 | CaCl$_2$ | — | 30 | 2.0 | 80 | 90 | BW | 60 | 8.0 |
| C 25 | 0.3 | CaCl$_2$ | — | 30 | 3.4 | 70 | 90 | BW | 60 | 8.0 |
| C 26 | 0.3 | CaCl$_2$ | — | 0.5 | 1.8 | 70 | 90 | BW | 60 | 8.0 |
| C 27 | 0.3 | CaCl$_2$ | — | 0.5 | 1.8 | RT | 60 | BW | 60 | 8.0 |
| C 28 | 0.3 | CaCl$_2$ | — | 0.5 | 1.8 | RT | 60 | BW | RT | 8.0 |
| C 29 | 0.3 | CaCl$_2$ | — | 0.3 | 1.8 | RT | 90 | BW | 60 | 8.0 |
| C 30 | 0.3 | MgCl$_2$ | — | 10 | 1.7 | RT | 90 | BW | 60 | 8.0 |
| C 31 | 0.3 | MgCl$_2$ | — | 10 | 3.4 | 35 | 80 | BW | 60 | 8.0 |
| C 32 | 0.5 | NaCl | — | 26 | 33 | 40 | 70 | BW | 60 | 8.0 |
| C 33 | 0.5 | CaCl$_2$ | — | 30 | 3.4 | 90 | 90 | BW | 60 | 8.0 |
| C 34 | 0.8 | NaCl | — | 26 | 33 | RT | 90 | BW | 60 | 8.0 |
| C 35 | 0.8 | CaCl$_2$ | — | 30 | 2.0 | 60 | 90 | BW | 60 | 8.0 |
| C 36 | 0.8 | MgCl$_2$/CaCl$_2$ | — | 10 | 1.9 | RT | 90 | BW | 60 | 8.0 |
| C 37 | 0.3 | H$_2$SO$_4$ | Gelatin [5000 ppm] | 0.2 | 1.68 | RT | 90 | BW | 60 | 8.0 |
| C 38 | 0.8 | MgCl$_2$ | Methylcellulose (0.5% by weight) | 20 | 1.0 | 75 | 75 | BW | 60 | 5 |

Comparative experiment C 37 was carried out according to the teaching of US-A-2,487,263, using acid-ashed gelatin having a viscosity of 92.1 cP (10% strength in water).

Comparative experiment C 38 was carried out according to the teaching of DE-A 23 32 096, using methylcellulose (Methocel EXP XZ from Dow).

In the examples in Tables 4 and 5, it is shown that significantly smaller amounts of salt are required for quantitative coagulation of the latex when using, according to the invention, magnesium salts if appropriate together with calcium salts in combination with gelatin than in the case of electrolyte coagulation without addition of gelatin.

After the coagulation of the latex had been carried out, the rubber crumb was removed from the latex serum by means of a sieve. About 200 g of the latex serum were usually taken and refluxed for ½ h to remove all polymer residues and filtered through a 20 μm sieve. The determination of the COD of the serum ($COD_{serum}$) was carried out in accordance with DIN 38 409, part 41 or H 41-1 and H 41-2 by determination of the consumption of potassium dichromate in sulphuric acid medium in the presence of a silver sulphate catalyst. From the COD of the serum ($COD_{serum}$), the COD remaining in the serum based on 1 kg of coagulated nitrile rubber ($COD_{NBR}$) was calculated with the aid of the equations given in the description.

TABLE 6

COD values for Examples 10-17 according to the invention

| Example | Precipitant | SC [% by wt.] | $m_{SC}$ [$g_{SC}$/kg of latex] | $COD_S$ [$g_{O2}$/$kg_{serum}$] | $COD_{NBR}$ [$g_{O2}$/$kg_{NBR}$] |
|---|---|---|---|---|---|
| 10 | $MgCl_2$/gelatin[1] | 23.79 | 20.2 | 52.9 | 174 |
| 11 | $MgCl_2$/gelatin[1] | 23.79 | 20.2 | 50.3 | 165 |
| 12 | $MgCl_2$/gelatin[2] | 23.79 | 15.5 | 59.4 | 194 |
| 13 | $MgCl_2$/gelatin[2] | 23.79 | 15.5 | 50.6 | 165 |
| 14 | $MgCl_2$/gelatin[2] | 23.79 | 15.5 | 55.9 | 183 |
| 15 | $MgCl_2$/gelatin[2] | 23.79 | 15.5 | 55.0 | 180 |
| 16 | $MgCl_2$/$CaCl_2$/gelatin[3] | 23.79 | 26.9 | 46.4 | 154 |
| 17 | $MgSO_4$/gelatin[4] | 23.79 | 18.1 | 53.1 | 174 |

TABLE 7

COD values of Comparative Examples C 18-C 38 which are not according to the invention

| Example | Precipitant | SC [% by weight] | $m_{SC}$ [$g_{SC}$/kg of latex] | $COD_S$ [$g_{O2}$/$kg_{serum}$] | $COD_{NBR}$ [$g_{O2}$/$kg_{NBR}$] |
|---|---|---|---|---|---|
| C 18 | NaCl | 23.79 | 30.2 | 36.3 | 162 |
| C 19 | $CaCl_2$ | 23.79 | 27.0 | 31.9 | 106 |
| C 20 | NaCl | 23.79 | 30.2 | 32.7 | 146 |
| C 21 | $CaCl_2$ | 23.79 | 15.9 | 39.2 | 128 |
| C 22 | $CaCl_2$ | 23.79 | 27.0 | 31.0 | 103 |
| C 23 | NaCl | 23.79 | 30.2 | 31.8 | 142 |
| C 24 | $CaCl_2$ | 23.79 | 15.9 | 35.5 | 116 |
| C 25 | $CaCl_2$ | 23.79 | 27.0 | 29.7 | 99 |
| C 26 | $CaCl_2$ | 23.79 | 856 | 13.8 | 94 |
| C 27 | $CaCl_2$ | 23.79 | 856 | 14.6 | 99 |
| C 28 | $CaCl_2$ | 23.79 | 856 | 14.4 | 98 |
| C 29 | $CaCl_2$ | 23.79 | 1427 | 13.5 | 124 |
| C 30 | $MgCl_2$ | 23.79 | 40.4 | 47.4 | 126 |
| C 31 | $MgCl_2$ | 23.79 | 80.9 | 39.3 | 139 |
| C 32 | NaCl | 23.79 | 30.2 | 32.4 | 145 |
| C 33 | $CaCl_2$ | 23.79 | 27.0 | 36.5 | 121 |
| C 34 | NaCl | 23.79 | 30.2 | 37.4 | 167 |
| C 35 | $CaCl_2$ | 23.79 | 15.9 | 38.7 | 128 |
| C 36 | $MgCl_2$/$CaCl_2$ | 23.79 | 45.2 | 27.5 | 93.3 |
| C 37 | $H_2SO_4$/gelatin | 23.79 | 2000 | 14.8 | 172 |
| C 38 | $MgCl_2$/methylcellulose | 23.79 | 11.9 | 44 | 143 |

As can be seen by comparison of the COD values reported in Tables 6 and 7, coagulation of the latex using $MgCl_2$, $MgCl_2$/$CaCl_2$ and $MgSO_4$ in the presence of gelatin gives a significant increase in the COD ($CSB_{NBR}$) per 1 kg of NBR, i.e. the amount of impurities remaining in the serum of the coagulated latex is increased by use of gelatin. This results in a nitrile rubber having a reduced content of impurities.

The impurities remaining in the nitrile rubber were extracted from aliquots of Comparative Examples C 30, C 31 and C 36 by multiple discontinuous washing. Washing was in each case carried out using the amount of deionized water which was separated off after the coagulation of the latex or after each individual washing step. Each washing step was carried out for 30 minutes at 90° C. with stirring. The amounts of COD extracted in the individual washing steps were in each case expressed per 1 kg of nitrile rubber ($COD_{NBR}$ (Table 8).

TABLE 8

COD extraction by washing of the crumb with deionized water at 90° C. for Comparative Examples C 30, C 31 and C 36 which were not according to the invention

| Example | Type of salt | Latex serum | 1st washing | 2nd washing | 3rd washing | Total |
|---|---|---|---|---|---|---|
| | | $COD_{NBR}$ [$g_{O2}$/$kg_{NBR}$] | | | | |
| C 30 | $MgCl_2$ | 126 | 12 | 4 | 1 | 143 |
| C 31 | $MgCl_2$ | 139 | 9 | 3 | 1 | 152 |
| C 32 | $MgCl_2$/$CaCl_2$ | 93.3 | 8 | 3 | 0.7 | 105 |

Table 8) lists, in the last column, the totals of the COD values obtained in the coagulation of the latex and in the three washing steps ($COD_{NBR}$). Comparison of these total COD values with the COD values obtained in the serum after coagulation of the latex in the examples according to the invention (Table 6) clearly shows that the total COD values of Examples C 30, C 31 and C 38 which are not according to the invention are lower than the COD values obtained in the serum when using gelatin as coprecipitant; i.e. a smaller amount of COD is included in the rubber crumb in the case of coagulation of the latex using gelatin as coprecipitant.

After washing was complete, the rubber crumb in Examples 10 to 17 according to the invention and Comparative examples C 18 to C 38 which are not according to the invention was taken off by means of a sieve and subjected to preliminary dewatering to a residual moisture content of from 5 to 15% by weight in a Welding screw.

The final drying of the rubber samples which had been subjected to preliminary dewatering was carried out batchwise in a vacuum drying oven at 70° C. to a residual moisture content of <1.5% by weight.

To determine the cation contents, aliquots of the rubber samples were ashed in accordance with DIN 53 568 and determined by means of atomic absorption spectroscopy in accordance with DIN 51401.

The cation contents and the ion indices of the nitrile rubbers according to the invention and those not according to the invention from Tables 4 and 5 are shown in Tables 9 and 10.

The dried NBR rubbers were characterized by the Mooney viscosity before and after hot air storage at 100° C. for 48 hours, i.e. the determination of the Mooney viscosity was carried out directly after drying (i.e. before hot air storage) and also subsequently after hot air ageing at 100° C. for 48 hours.

TABLE 11

Storage stabilities of the nitrile rubbers 10 to 17 produced according to the invention

| | | ML (1 + 4@100° c.) [MU] | | |
|---|---|---|---|---|
| Example | Precipitant | MV1 | MV2 | SS |
| 10 | MgCl$_2$/gelatin | 39 | 39 | 0 |
| 11 | MgCl$_2$/gelatin | 40 | 39 | −1 |
| 12 | MgCl$_2$/gelatin | 39 | 38 | −1 |
| 13 | MgCl$_2$/gelatin | 40 | 38 | −2 |

TABLE 9

Ion contents/ion indices of the nitrile rubbers from examples 10-17 produced according to the invention

| | | Cl content [ppm] | Cation content | | | | |
|---|---|---|---|---|---|---|---|
| Example | Precipitant | | Ca [ppm] | Mg [ppm] | Na [ppm] | K [ppm] | II |
| 10 | MgCl$_2$/Gelatin | 55 | 108 | 151 | 66 | 14 | 23.7 |
| 11 | MgCl$_2$/Gelatin | 74 | 87 | 150 | 101 | 39 | 19.9 |
| 12 | MgCl$_2$/Gelatin | 94 | 83 | 120 | 192 | 25 | 12.2 |
| 13 | MgCl$_2$/Gelatin | n.d | 56 | 163 | 150 | 20 | 17.5 |
| 14 | MgCl$_2$/Gelatin | 90 | 84 | 125 | 175 | 54 | 12.9 |
| 15 | MgCl$_2$/Gelatin | 75 | 91 | 120 | 103 | 31 | 16.6 |
| 16 | MgCl$_2$/CaCl$_2$/Gelatin | n.d | 118 | 115 | 260 | 54 | 10.5 |
| 17 | MgSO$_4$/Gelatin | 4 | 120 | 130 | 25 | 15 | 23.8 |

TABLE 10

Cation contents/ion indices of the nitrile rubbers from Examples C 18-C 38 not produced according to the invention

| | | Cl content [ppm] | Cation content | | | | |
|---|---|---|---|---|---|---|---|
| Example | Precipitant | | Ca [ppm] | Mg [ppm] | Na [ppm] | K [ppm] | II |
| C16 | NaCl | 260 | 247 | 9 | 250 | 12 | 8.0 |
| C17 | CaCl2 | 220 | 1595 | 5 | 131 | 34 | 113.7 |
| C18 | NaCl | 370 | 151 | 9 | 263 | 40 | −4.2 |
| C19 | CaCl2 | 220 | 1225 | 5 | 160 | 59 | 84.0 |
| C20 | CaCl2 | 180 | 1535 | 4 | 93 | 29 | 110.8 |
| C21 | NaCl | 460 | 289 | 10 | 340 | 18 | 7.7 |
| C22 | CaCl2 | 180 | 1220 | 4 | 173 | 50 | 83.2 |
| C23 | CaCl2 | 240 | 1580 | 4 | 178 | 53 | 109.9 |
| C24 | CaCl2 | 130 | 1485 | 4 | 177 | 56 | 102.7 |
| C25 | CaCl2 | 110 | 1585 | 5 | 140 | 44 | 112.3 |
| C26 | CaCl2 | 80 | 1445 | 9 | 135 | 47 | 102.4 |
| C27 | CaCl2 | 74 | 1470 | 5 | 80 | 19 | 106.9 |
| C28 | MgCl2 | 150 | 120 | 355 | 132 | 15 | 47.3 |
| C29 | MgCl2 | 150 | 125 | 395 | 98 | 11 | 54.2 |
| C30 | NaCl | 240 | 226 | 9 | 210 | 5 | 8.8 |
| C31 | CaCl2 | 120 | 1255 | 7 | 100 | 34 | 89.8 |
| C32 | NaCl | 120 | 265 | 8 | 260 | 15 | 9.2 |
| C33 | CaCl2 | 120 | 1255 | 7 | 108 | 37 | 89.4 |
| C34 | MgCl2/CaCl2 | n.d | 690 | 335 | 320 | 105 | 77.0 |
| C35 | H2SO4/Gelatin | n.d | n.d | n.d | n.d | n.d | n.d |
| C36 | MgCl2/methylcellulose | n.d | 365 | 20 | 12 | 3 | 29.3 |

TABLE 11-continued

Storage stabilities of the nitrile rubbers 10 to 17 produced according to the invention

| Example | Precipitant | ML (1 + 4@100° c.) [MU] | | |
|---|---|---|---|---|
| | | MV1 | MV2 | SS |
| 14 | MgCl$_2$/gelatin | 40 | 38 | −2 |
| 15 | MgCl$_2$/gelatin | 40 | 38 | −2 |
| 16 | MgCl$_2$/CaCl$_2$/gelatin | 42 | 46 | 4 |
| 17 | MgSO$_4$/gelatin | 41 | 45 | 4 |

TABLE 12

Storage stabilities of the nitrile rubbers C18 to C 38 not produced according to the invention

| Example | Precipitant | ML (1 + 4@100° c.) [MU] | | |
|---|---|---|---|---|
| | | MV1 | MV2 | SS |
| C 18 | NaCl | 40 | 39 | −1 |
| C 19 | CaCl$_2$ | 40 | 40 | 0 |
| C 20 | NaCl | 39 | 39 | 0 |
| C 21 | CaCl$_2$ | 39 | 38 | −1 |
| C 22 | CaCl$_2$ | 40 | 39 | −1 |
| C 23 | NaCl | 39 | 38 | −1 |
| C 24 | CaCl$_2$ | 39 | 39 | 0 |
| C 25 | CaCl$_2$ | 39 | 39 | 0 |
| C 26 | CaCl$_2$ | 40 | 39 | −1 |
| C 27 | CaCl$_2$ | 41 | 40 | −1 |
| C 28 | CaCl$_2$ | 41 | 39 | −2 |
| C 29 | CaCl$_2$ | 39 | 40 | 1 |
| C 30 | MgCl$_2$ | 40 | 46 | 6 |
| C 31 | MgCl$_2$ | 42 | 49 | 7 |
| C 32 | NaCl | 41 | 47 | 6 |
| C 33 | CaCl$_2$ | 38 | 38 | 0 |
| C 34 | NaCl | 40 | 37 | −3 |
| C 35 | CaCl$_2$ | 41 | 38 | −3 |
| C 36 | MgCl$_2$/CaCl$_2$ | 42 | 46 | +4 |
| C 37 | H$_2$SO$_4$/gelatin | 43 | 53 | +10 |
| C 38 | MgCl$_2$/methylcellulose | 43 | 41 | −2 |

It can be seen from Tables 9 and 11 that the nitrile rubbers produced according to the invention have good storage stabilities even at Ca contents of <150 ppm. The nitrile rubber which has been produced not according to the invention but according to U.S. Pat. No. 2,487,263 has poor storage stability and was not examined further.

Rubber mixtures based on the nitrile rubbers described in Tables 4 and 5 were produced as per Table 13 in a 1.5 l laboratory kneader, with the individual constituents of the mixture being mixed in the order indicated in the table. All constituents of the mixture are reported in parts by weight based on 100 parts by weight of the nitrile rubber.

TABLE 13

Composition of the rubber mixtures

| Constituents of the mixture | Amount in parts by weight |
|---|---|
| NBR | 100.0 |
| Stearic acid | 2.0 |
| Zinc oxide | 5.0 |
| Carbon black N 330 | 40.0 |
| Phenol-formaldehyde resin (Plastikator ® FH) | 5.0 |
| N-Cyclohexylbenzothiazylsulphenamide (Vulkacit ® CZ) | 0.9 |
| Sulphur | 1.5 |

The vulcanization behaviour of the mixtures was determined in a rheometer at 160° C. in accordance with DIN 53 529 using the Monsanto rheometer MDR 2000E. The characteristic vulcanization times $t_{10}$ and $t_{90}$ were determined in this way.

In accordance with DIN 53 529, part 3:

$t_{10}$: time at which 10% of the conversion has been achieved $t_{90}$: time at which 90% of the conversion has been achieved The vulcanized test specimens required for the further measurements were produced by vulcanization at 160° C. in a press under a hydraulic pressure of 120 bar for 30 minutes. The stress at 300% elongation ($\sigma_{300}$), the tensile strength ($\sigma_{max}$) and the elongation at break ($\epsilon_b$) of the vulcanizates were determined by means of a tensile test in accordance with DIN 53504.

TABLE 14

Vulcanization behaviour and vulcanizate properties of the nitrile rubbers according to the invention from Table 4

| Example | BKF addition [phr] | Precipitant | Vulcanization | | | | | Vulcanizate properties | | |
|---|---|---|---|---|---|---|---|---|---|---|
| | | | II | MS 5 (120° c.) [min] | $t_{10}$ [sec] | $t_{90}$ [sec] | $t_{90} − t_{10}$ [sec] | $\sigma_{300}$ [MPa] | $\sigma_{max}$ [MPa] | $\epsilon_b$ [%] |
| 10 | 0.1 | MgCl$_2$/gelatin | 23.7 | 43 | 5.1 | 11.1 | 6.0 | 9.5 | 23.3 | 562 |
| 11 | 0.2 | MgCl$_2$/gelatin | 19.9 | 41 | 5.0 | 10.6 | 5.6 | 9.9 | 22.6 | 529 |
| 12 | 0.3 | MgCl$_2$/gelatin | 12.2 | 35 | 4.9 | 10.4 | 5.5 | 9.5 | 24.1 | 576 |
| 13 | 0.5 | MgCl$_2$/gelatin | 17.5 | 34 | 4.7 | 12.3 | 7.6 | 9.2 | 22.0 | 530 |
| 14 | 0.5 | MgCl$_2$/gelatin | 12.9 | 32 | 4.3 | 11.8 | 7.5 | 9.4 | 22.0 | 524 |
| 15 | 0.8 | MgCl$_2$/gelatin | 16.6 | 31 | 4.4 | 11.9 | 7.5 | 9.4 | 22.9 | 562 |
| 16 | 0.8 | MgCl$_2$/CaCl$_2$/gelatin | 10.5 | 43 | 5.6 | 12.9 | 7.3 | 9.7 | 25.4 | 590 |
| 17 | 0.8 | MgSO4/gelatin | 23.8 | 42 | 5.2 | 11.8 | 6.6 | 10.0 | 23.0 | 525 |

TABLE 15

Vulcanization behaviour and vulcanization properties of the nitrile rubbers not according to the invention from Table 5

| | BKF | | | Vulcanization | | | | Vulcanizate properties | | |
|---|---|---|---|---|---|---|---|---|---|---|
| Example | addition [phr] | Precipitant | II | MS 5 (120° c.) [min] | $t_{10}$ [sec] | $t_{90}$ [sec] | $t_{90}-t_{10}$ [sec] | $\sigma_{300}$ [MPa] | $\sigma_{max}$ [MPa] | $\epsilon_b$ [%] |
| C18 | 0.1 | NaCl | 4.0 | 49 | 5.5 | 11.5 | 6 | 10 | 23.5 | 550 |
| C19 | 0.1 | CaCl$_2$ | 113.7 | 53 | 5.9 | 17.4 | 11.5 | 9.3 | 24.4 | 592 |
| C20 | 0.2 | NaCl | −4.2 | 43 | 5 | 11.2 | 6.2 | 9.9 | 23.6 | 548 |
| C21 | 0.2 | CaCl$_2$ | 84.0 | 44 | 5.2 | 14 | 8.8 | 9.1 | 22.4 | 568 |
| C22 | 0.2 | CaCl$_2$ | 110.8 | 51 | 6.1 | 17.3 | 11.2 | 9.0 | 22.6 | 563 |
| C23 | 0.3 | NaCl | −1.8 | 39 | 4.9 | 11.1 | 6.2 | 9.8 | 22.4 | 538 |
| C24 | 0.3 | CaCl$_2$ | 83.2 | 44 | 5.5 | 14.3 | 8.8 | 8.9 | 21.6 | 556 |
| C25 | 0.3 | CaCl$_2$ | 109.9 | 47 | 5.9 | 17.6 | 11.7 | 8.9 | 21.1 | 552 |
| C26 | 0.3 | CaCl$_2$ | 102.7 | 53 | 6.6 | 19 | 12.4 | 8.4 | 22.0 | 603 |
| C27 | 0.3 | CaCl$_2$ | 112.3 | 56 | 6.8 | 19.1 | 12.3 | 8.3 | 23.0 | 626 |
| C28 | 0.3 | CaCl$_2$ | 102.4 | 56 | 7.0 | 20.3 | 13.3 | 8.2 | 22.4 | 623 |
| C29 | 0.3 | CaCl$_2$ | 106.9 | 52 | 6.4 | 16.6 | 10.2 | 8.9 | 23.1 | 610 |
| C30 | 0.3 | MgCl$_2$ | 47.3 | 40 | 5.3 | 13.4 | 8.1 | 9.0 | 24.0 | 600 |
| C31 | 0.3 | MgCl$_2$ | 54.2 | 43 | 5.4 | 12.9 | 7.5 | 8.8 | 23.7 | 605 |
| C32 | 0.5 | NaCl | 1.3 | 35 | 5.0 | 13.1 | 8.1 | 9.8 | 24.6 | 577 |
| C33 | 0.5 | CaCl$_2$ | 89.8 | 43 | 5.6 | 14.2 | 8.6 | 8.9 | 22.4 | 587 |
| C34 | 0.5 | NaCl | −2.7 | 32 | 4.5 | 12.6 | 8.1 | 9.6 | 23.9 | 527 |
| C36 | 0.8 | CaCl$_2$ | 89.4 | 38 | 5.1 | 16.3 | 11.2 | 8.7 | 22.6 | 592 |
| C37 | 0.3 | MgCl$_2$/—CaCl$_2$ | 77.0 | 48 | 6.0 | 17.3 | 11.3 | 9.1 | 25.1 | 616 |
| C38 | 0.8 | MgCl$_2$/methylcellulose | 29.3 | 55 | 7.9 | 15.9 | 8.0 | 7.7 | 22.7 | 622 |

Tables 14 and 15 show that the Mooney scorch MS$_5$, the vulcanization rate ($t_{90}$-$t_{10}$) and the vulcanizate properties, in particular the stress at 300% elongation ($\sigma_{300}$, depend essentially on the concentration and the relative ratio of the cations in the nitrile rubber. The properties of the nitrile rubbers are determined to a significant extent by the calcium and magnesium contents. It is found that the NBR latices according to the invention which have been coagulated using a magnesium salt in combination with gelatin have a lower Mooney scorch and shorter vulcanization times than nitrile rubbers which have been coagulated in a manner not according to the invention using a divalent electrolyte. The stresses at 300% elongation of the nitrile rubbers coagulated using magnesium chloride/gelatin are higher than in the case of the nitrile rubbers coagulated using calcium chloride and magnesium chloride. The level of mechanical properties attained using gelatin as coprecipitant is not achieved when using methylcellulose as coprecipitant.

What is claimed is:

1. Nitrile rubber comprising:
    repeating units of at least one α,β-unsaturated nitrile, at least one conjugated diene and optionally one or more further copolymerizable monomers; and
    further comprising calcium, magnesium, sodium and/or potassium ions, and
    wherein the nitrile rubber further comprises magnesium ions in a concentration in the range from 100-180 ppm and calcium ions in a concentration in the range from 50-145 ppm, in each case based on the nitrile rubber.

2. The nitrile rubber according to claim 1 having an ion index ("II") according to the general formula (I) in the range from 5 to 30 ppm×mol/g, $$II = 3\left[\frac{c(Ca^{2+})}{40 \text{ g/mol}} + \frac{c(Mg^{2+})}{24 \text{ g/mol}}\right] - \left[\frac{c(Na^+)}{23 \text{ g/mol}} + \frac{c(K^+)}{39 \text{ g/mol}}\right] \quad (I)$$

where $c(Ca^{2+})$, $c(Mg^{2+})$, $c(Na^+)$ and $c(K^+)$ indicate the concentrations of the calcium, magnesium, sodium and potassium ions in the nitrile rubber in units of ppm.

3. The nitrile rubber according to claim 1, wherein said nitrile rubber contains repeating units of acrylonitrile and 1,3-butadiene and optionally one or more further copolymerizable monomers.

4. The nitrile rubber according to claim 3, wherein said nitrile rubber further comprises repeating units of one or more α,β-unsaturated monocarboxylic or dicarboxylic acids, their esters or amides.

5. Nitrile rubber according to claim 3, wherein said nitrile rubber further comprises repeating units of an alkyl ester of an α,β-unsaturated carboxylic acid.

6. Nitrile rubber according to claim 3, wherein said nitrile rubber further comprises repeating units of methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate and/or lauryl(meth)acrylate.

7. Nitrile rubber according to claim 1 having a Mooney viscosity (ML (1+4 @ 100° C.)) of from 10 to 150 Mooney units.

8. The nitrile rubber according to claim 1 having a glass transition temperature in the range from −70° C. to +10° C.

9. The nitrile rubber according to claim 1, wherein said nitrile rubber comprises 2,2,4,6,6-pentamethylheptane-4-thiol and/or 2,4,4,6,6-pentamethylheptane-2-thiol, 2,3,4,6,6-pentamethylheptane-2-thiol, and 2,3,4,6,6-pentamethylheptane-3-thiol.

10. Nitrile rubber according to claim 1 wherein the II is in the range of from 10 to 25 ppm×mol/g.

11. Nitrile rubber according to claim 1 having a Mooney viscosity (ML (1+4 @ 100° C.)) of from 20 to 100 Mooney units.

12. Nitrile rubber according to claim 1 having a glass transition temperature in the range from −60° C. to 0° C.

* * * * *